(12) United States Patent
Nagaraju et al.

(10) Patent No.: US 10,743,367 B2
(45) Date of Patent: Aug. 11, 2020

(54) METHOD AND SYSTEM FOR MANAGING ENRICHED CALL DATA IN COMMUNICATION NETWORK

(71) Applicant: Samsung Electronics Co., Ltd, Suwon-si (KR)

(72) Inventors: Sunil Kumar Nagaraju, Bangalore (IN); Suman Tiwari, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/345,683

(22) PCT Filed: Oct. 27, 2017

(86) PCT No.: PCT/KR2017/012026
§ 371 (c)(1),
(2) Date: Apr. 26, 2019

(87) PCT Pub. No.: WO2018/080243
PCT Pub. Date: May 3, 2018

(65) Prior Publication Data
US 2019/0261452 A1 Aug. 22, 2019

(30) Foreign Application Priority Data

Oct. 28, 2016 (IN) .............................. 201641037100
Oct. 25, 2017 (IN) .............................. 201641037100

(51) Int. Cl.
*H04L 12/801* (2013.01)
*H04W 84/16* (2009.01)
(Continued)

(52) U.S. Cl.
CPC ............. *H04W 80/10* (2013.01); *H04W 4/16* (2013.01); *H04W 8/18* (2013.01); *H04W 8/24* (2013.01);
(Continued)

(58) Field of Classification Search
CPC ......... H04W 80/10; H04W 8/24; H04W 8/18; H04W 4/16; H04W 12/06; H04W 12/001; H04L 2/00514
See application file for complete search history.

(56) References Cited

U.S. PATENT DOCUMENTS 6,480,885 B1 * 11/2002 Olivier ................ H04L 12/1859
709/202
6,891,938 B1 5/2005 Scott et al.
(Continued)

FOREIGN PATENT DOCUMENTS

EP 2717554 A1 4/2014
KR 10-2016-0094212 A 8/2016

OTHER PUBLICATIONS

International Search Report dated Jan. 25, 2018 in connection with International Patent Application No. PCT/KR2017/012026, 3 pages.
(Continued)

*Primary Examiner* — Faruk Hamza
*Assistant Examiner* — Abusayeed M Haque

(57) ABSTRACT

Embodiments herein disclose a method for managing enriched call data in a communication network. The method includes receiving an enriched call data from at least one enriched data channel, receiving at least one voice call data from at least one voice data channel from at least one mobile originator, wherein the at least one voice call data includes a header including a unique composer identifier, mapping the at least one voice call data to the enriched call data based on the unique composer identifier, and identifying an association of the at least one mobile originator with the enriched call data and the at least one voice call data based on the mapping.

20 Claims, 12 Drawing Sheets

(51) Int. Cl.
*H04L 29/06* (2006.01)
*H04W 80/10* (2009.01)
*H04W 12/00* (2009.01)
*H04W 4/16* (2009.01)
*H04W 8/18* (2009.01)
*H04W 8/24* (2009.01)
*H04W 12/06* (2009.01)

(52) U.S. Cl.
CPC ...... *H04W 12/00514* (2019.01); *H04W 12/06* (2013.01)

(56) References Cited

U.S. PATENT DOCUMENTS

| | | |
|---|---|---|
| 9,930,074 B2 | 3/2018 | Chebolu et al. |
| 2003/0139172 A1 | 7/2003 | Lampela et al. |
| 2004/0076277 A1* | 4/2004 | Kuusinen ............ H04L 12/1822 379/202.01 |
| 2008/0310312 A1* | 12/2008 | Acharya ............ H04L 65/1076 370/241 |
| 2009/0276396 A1* | 11/2009 | Gorman .................. G06F 40/30 |
| 2015/0230199 A1 | 8/2015 | Jeong et al. |
| 2016/0142447 A1* | 5/2016 | Mufti .................. H04L 65/1046 370/260 |
| 2016/0260136 A1* | 9/2016 | Schwartz ........... G06Q 30/0269 |

OTHER PUBLICATIONS

Written Opinion of the International Searching Authority dated Jan. 25, 2018 in connection with International Patent Application No. PCT/KR2017/012026, 5 pages.

* cited by examiner

[Fig. 1]
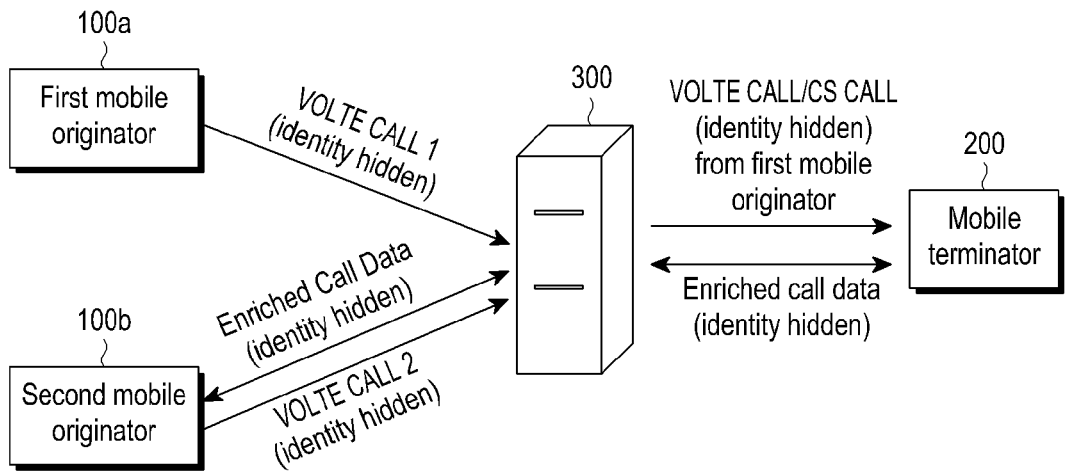
[Fig. 2]
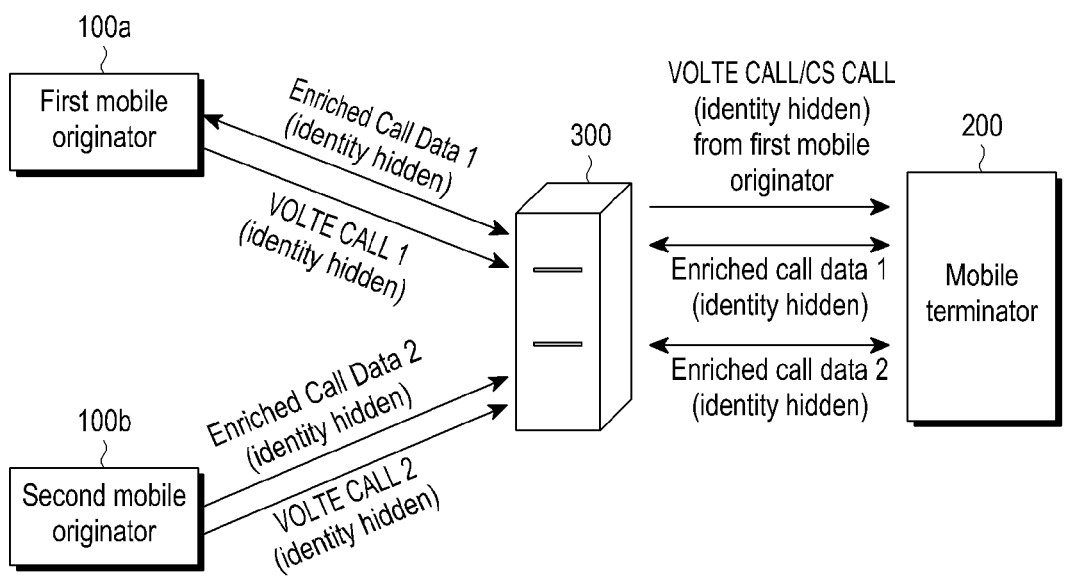
[Fig. 3]
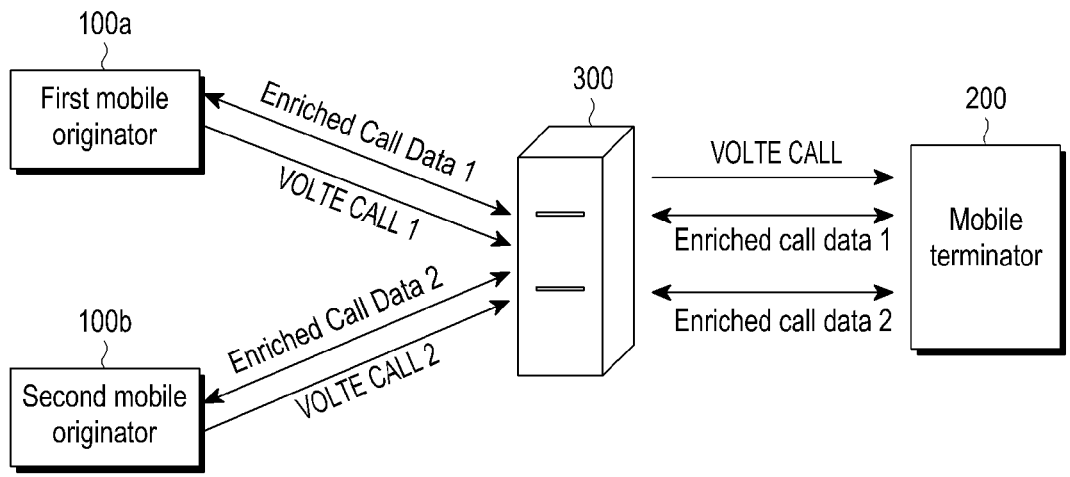

[Fig. 4]
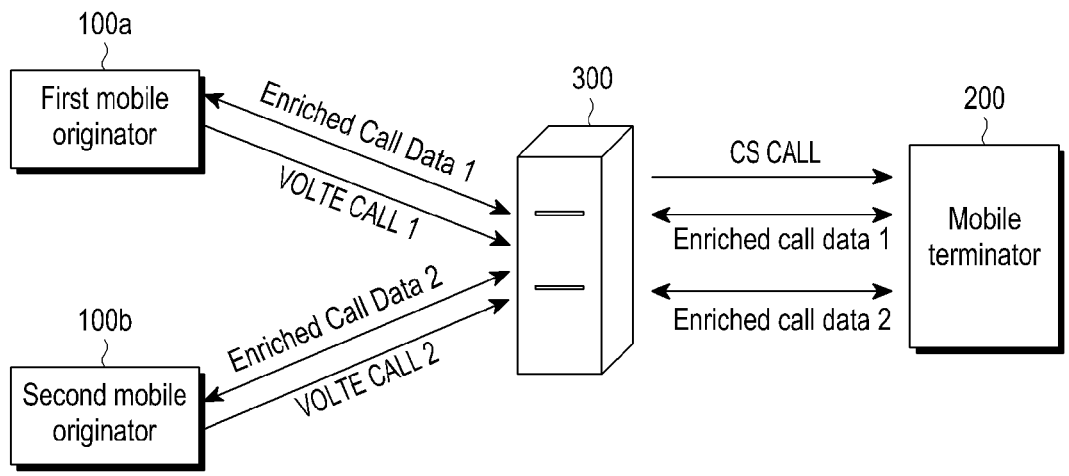
[Fig. 5]
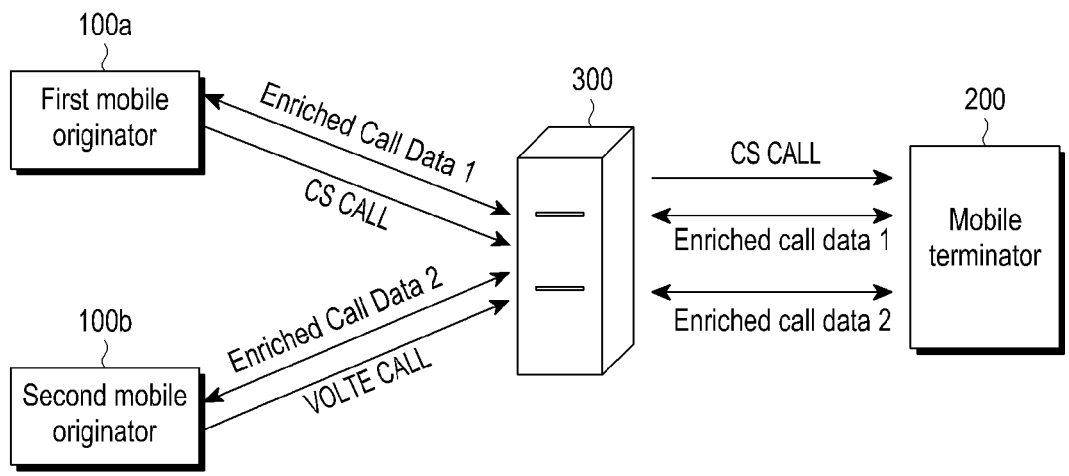
[Fig. 6]
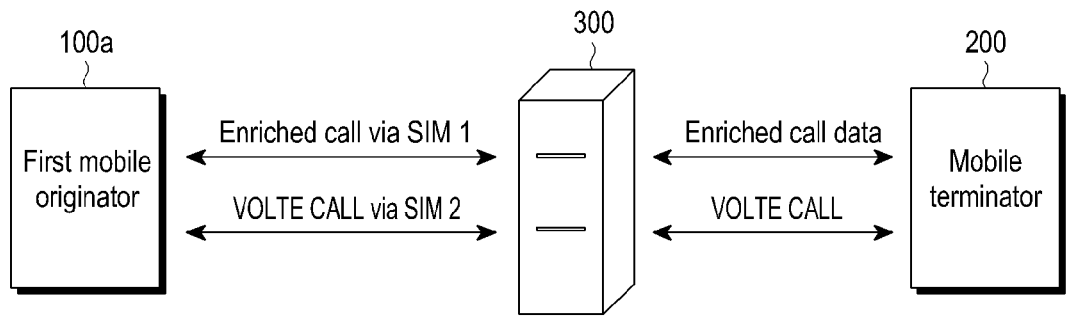

[Fig. 7]
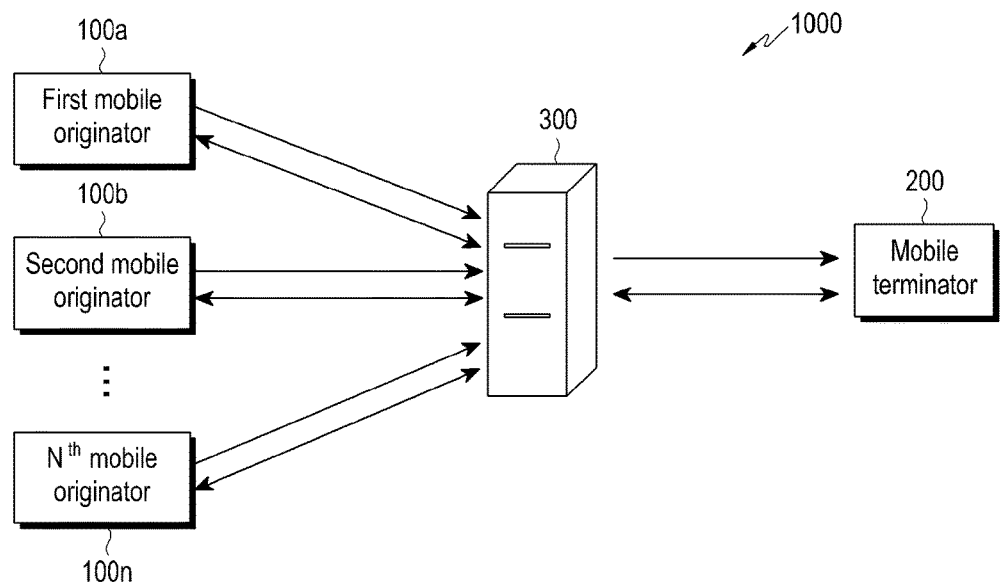
[Fig. 8]
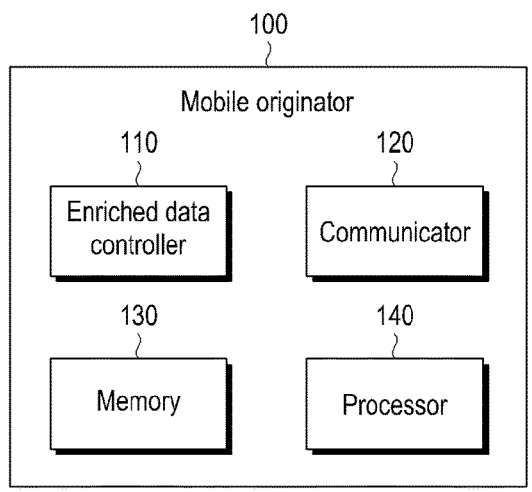
[Fig. 9]
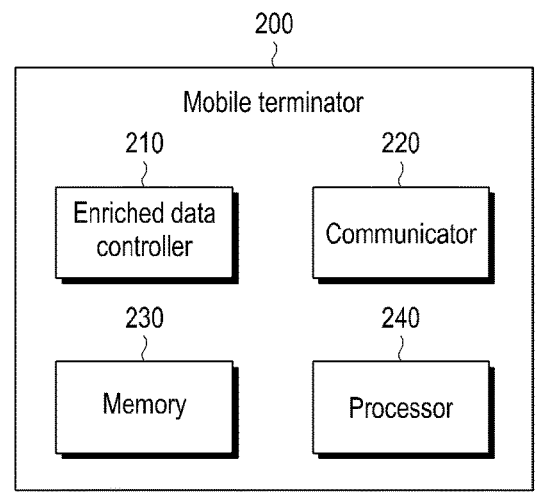

[Fig. 10]
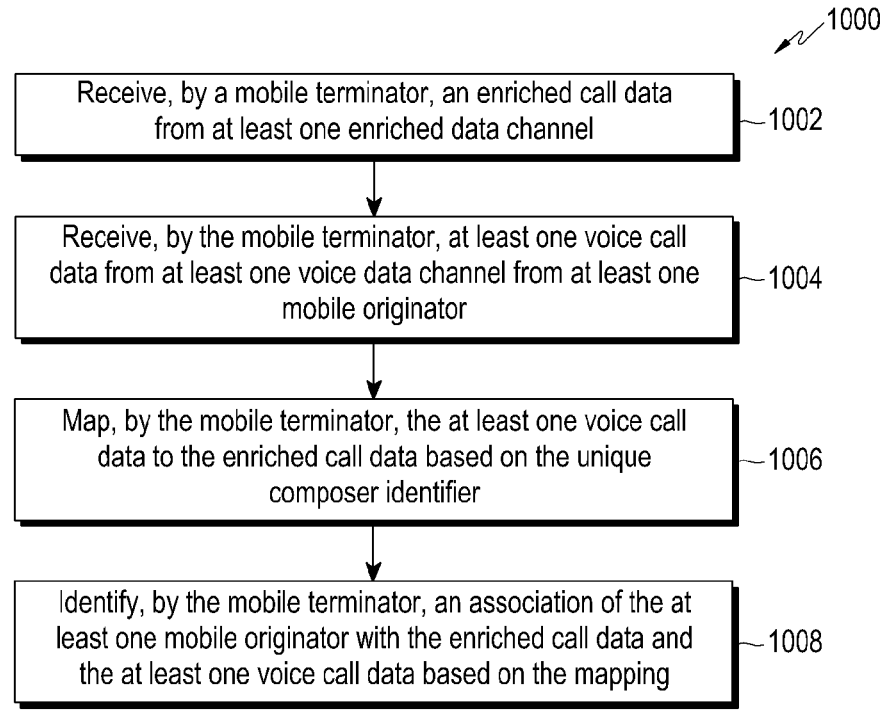
[Fig. 11]
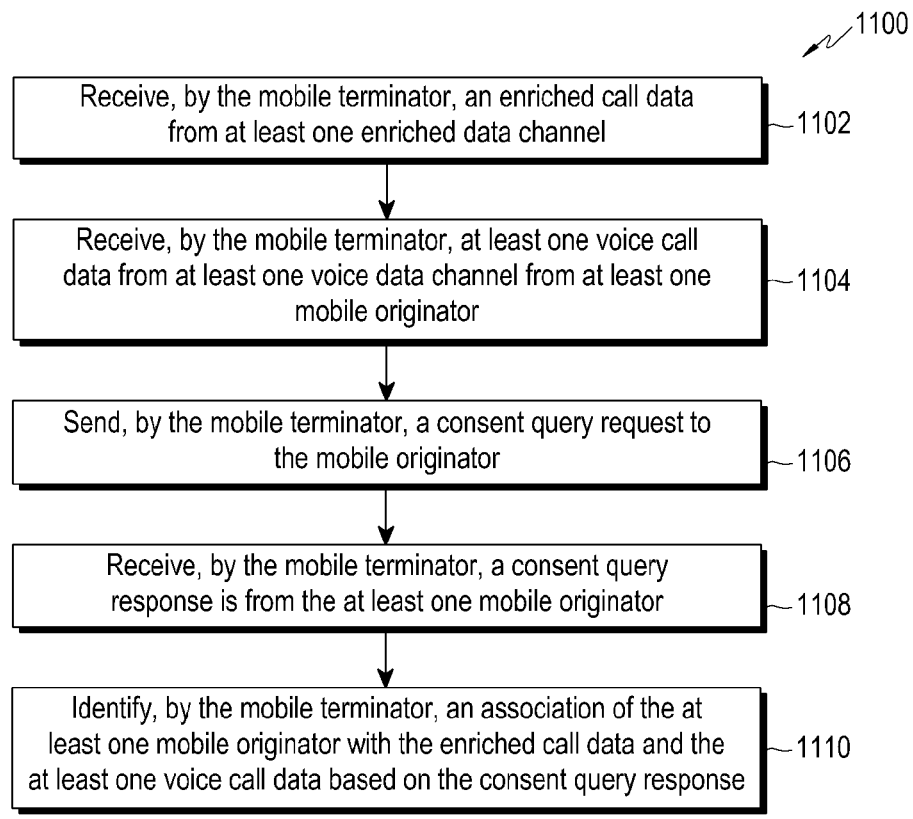

[Fig. 12]
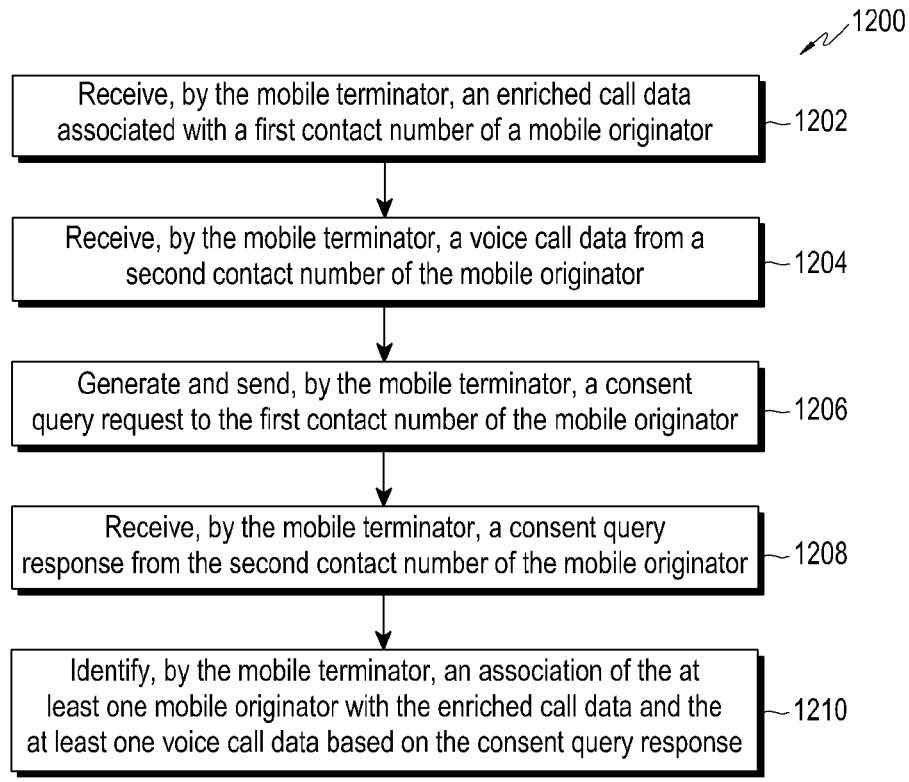
[Fig. 13]
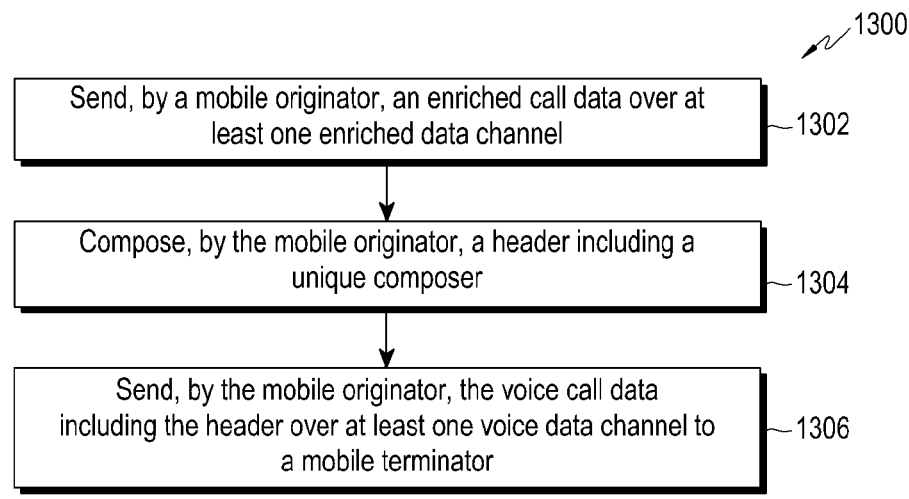

[Fig. 14]
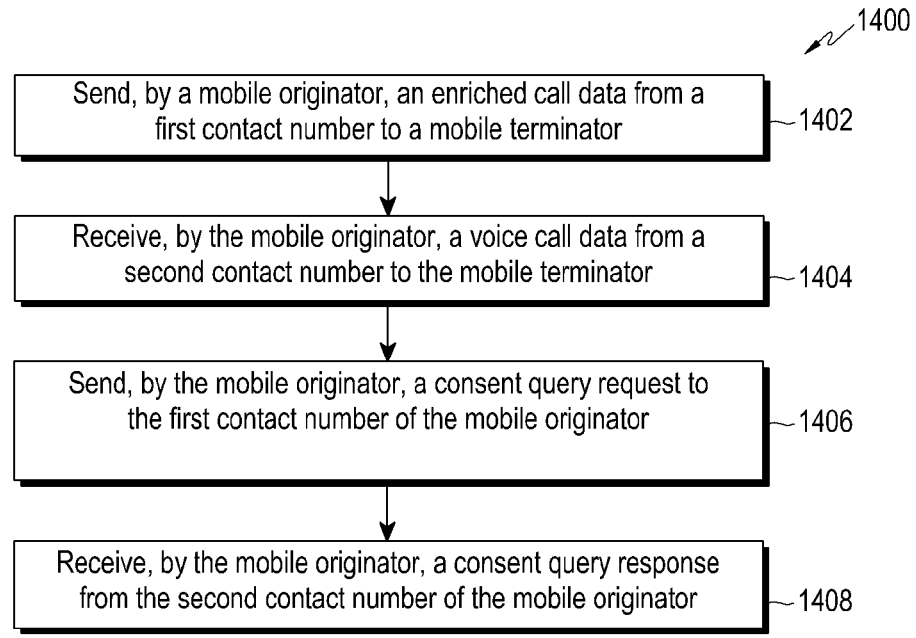
[Fig. 15]
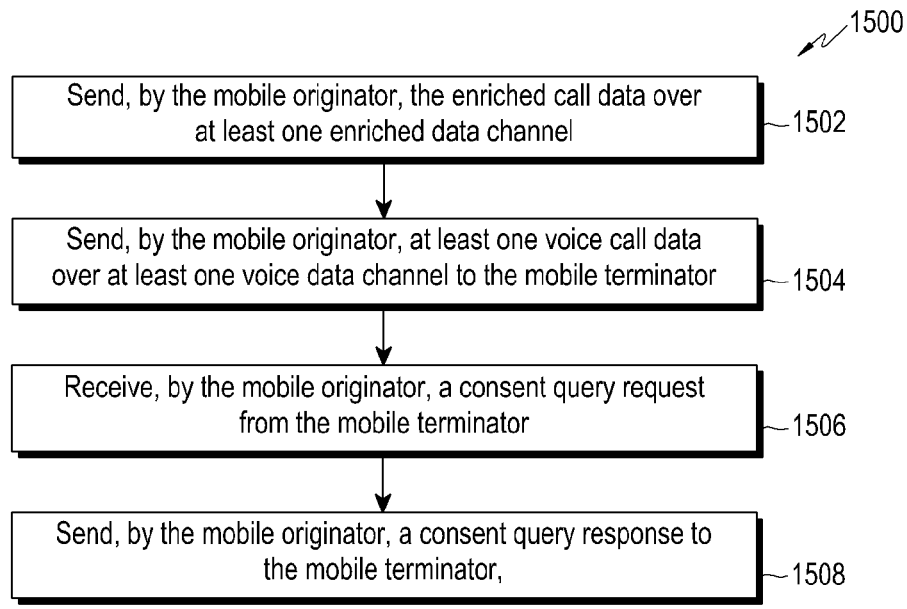

[Fig. 16]
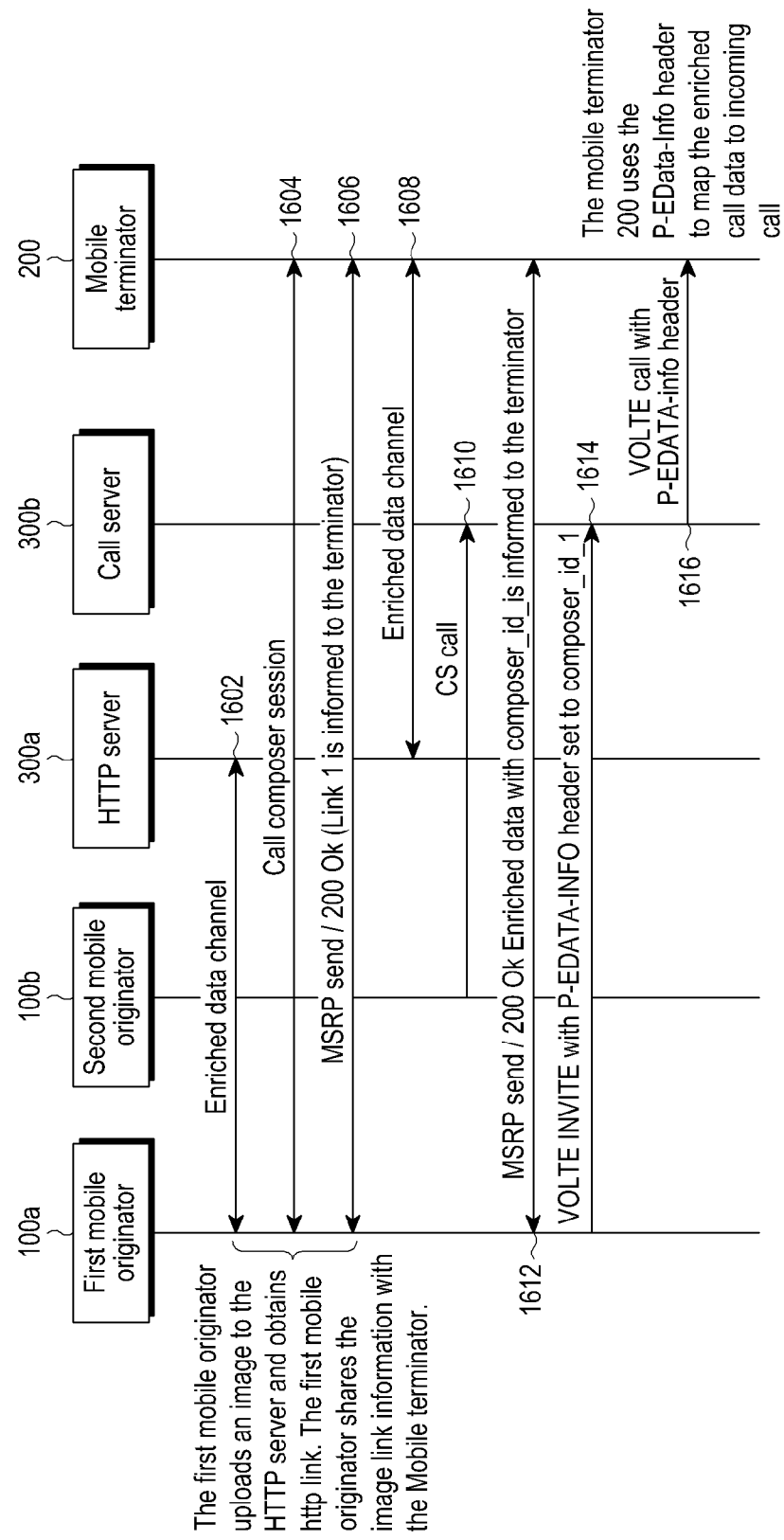

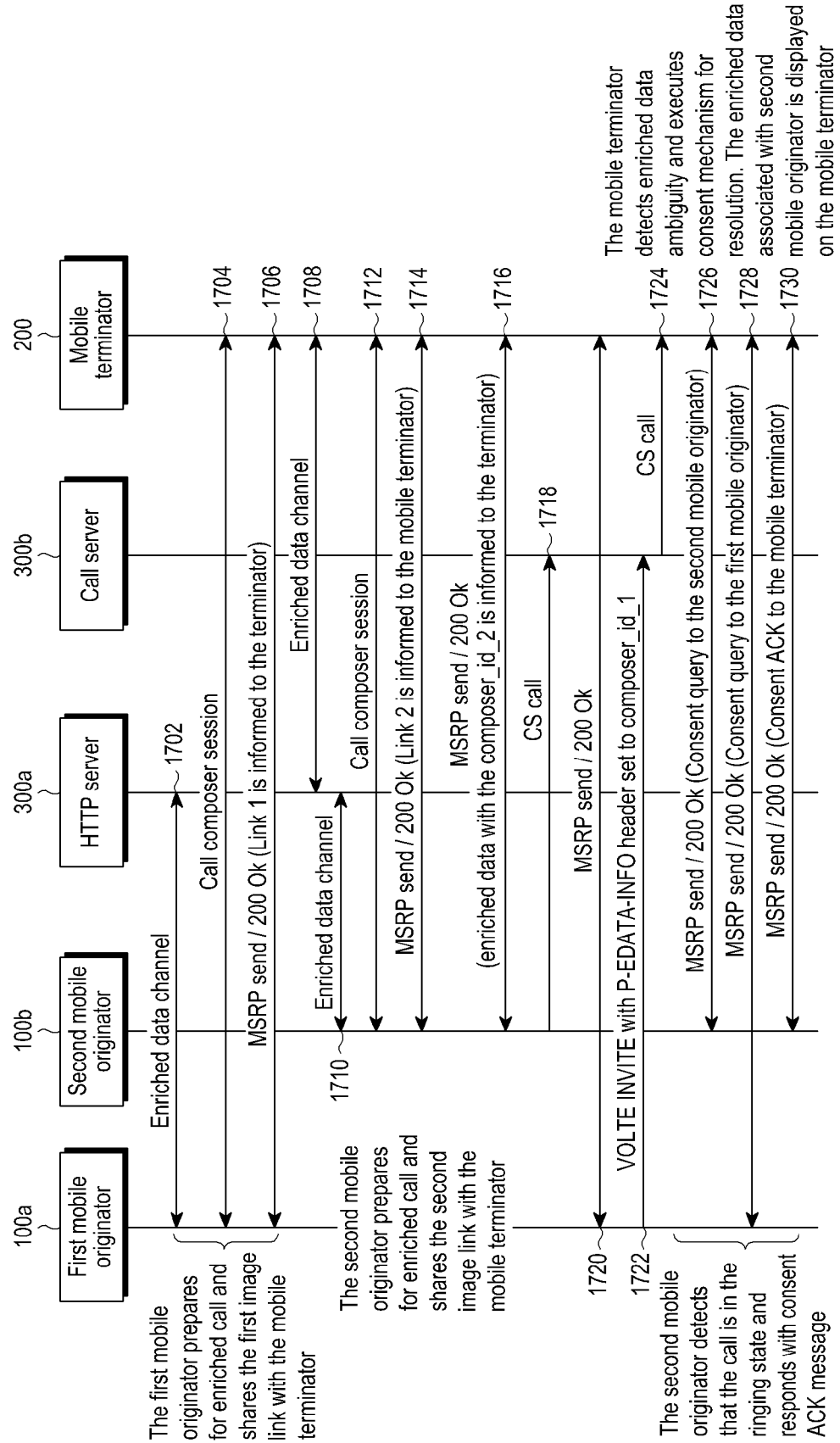
[Fig. 17]

[Fig. 18]
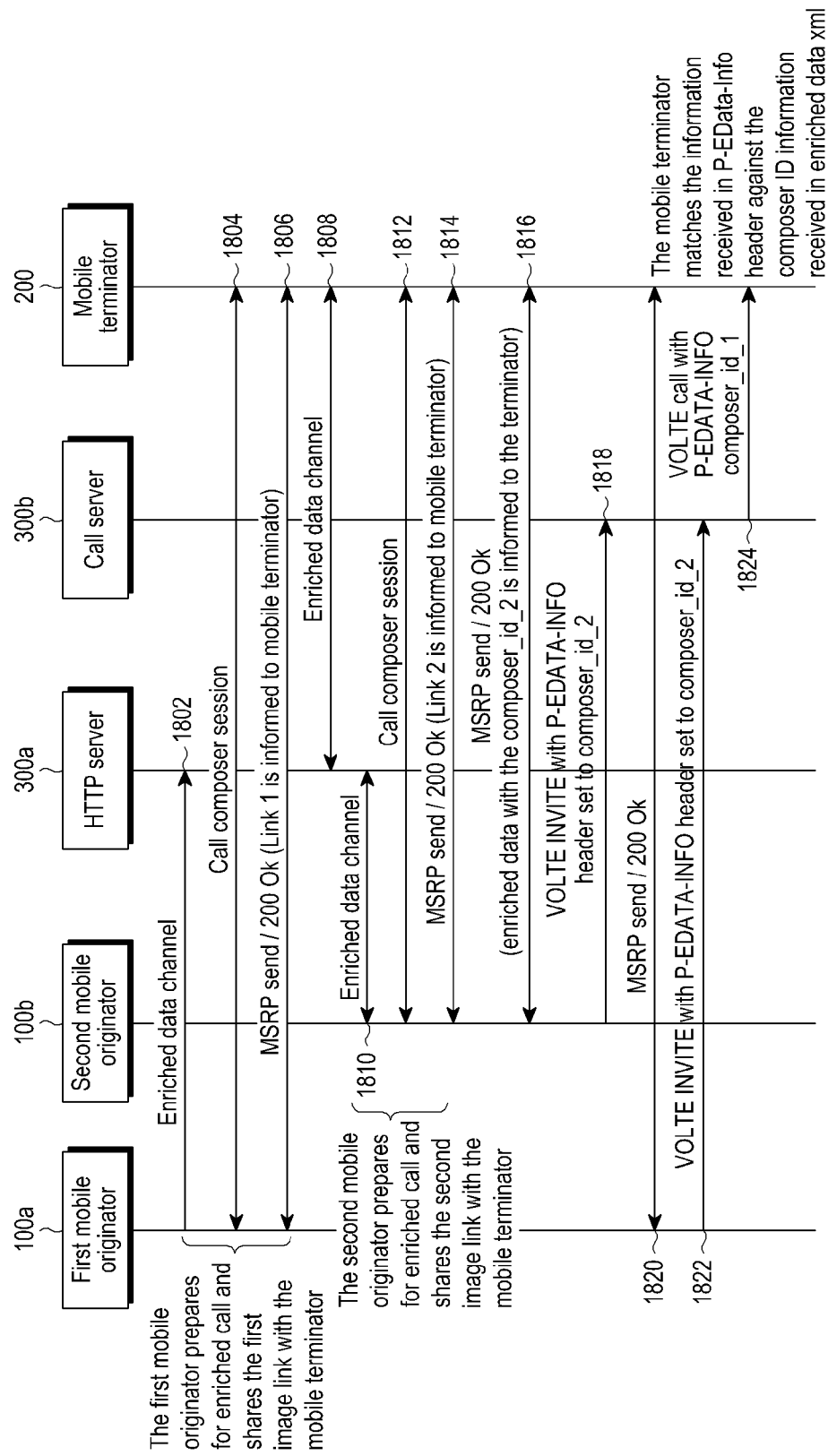

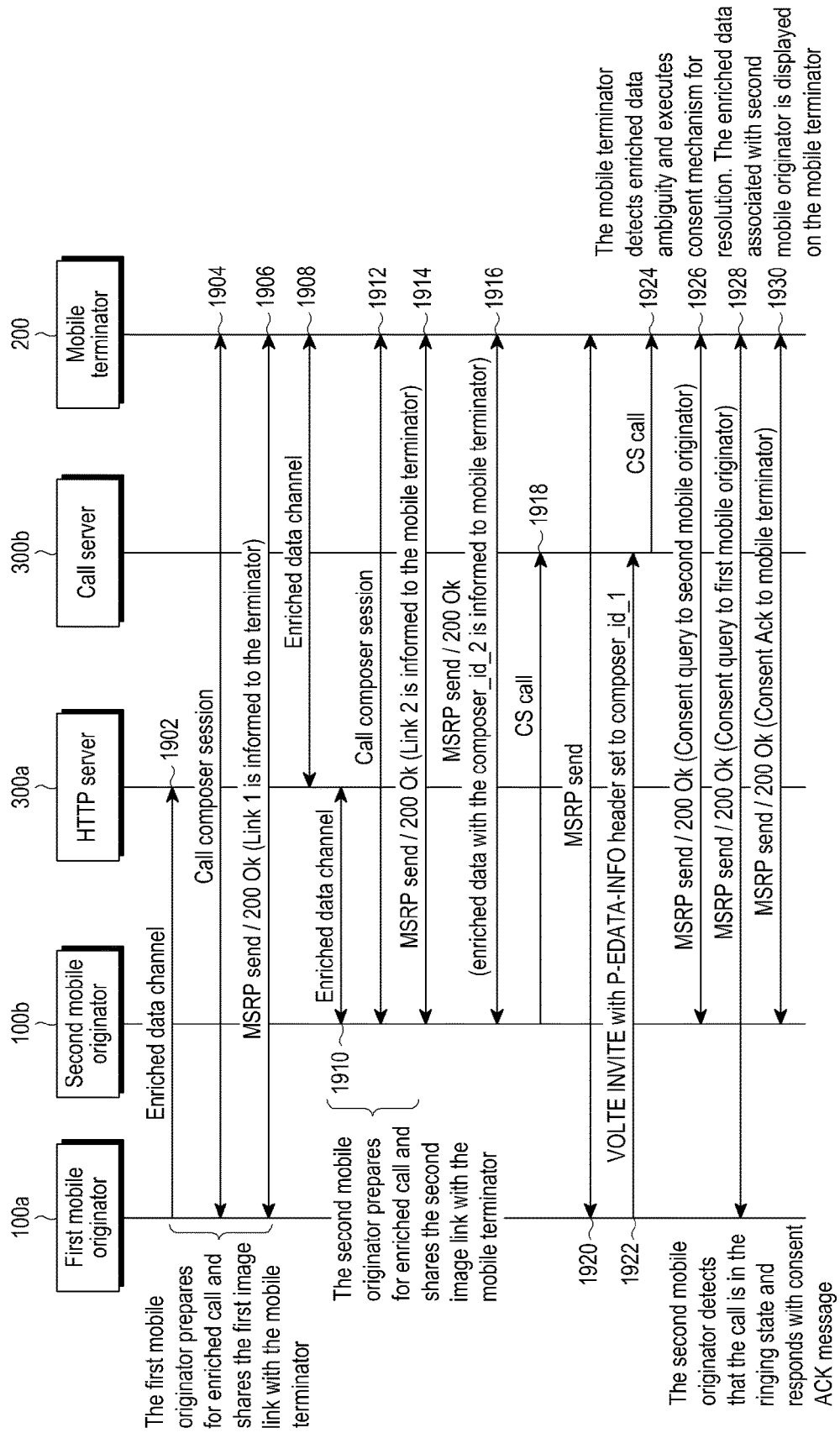
[Fig. 19]

[Fig. 20]
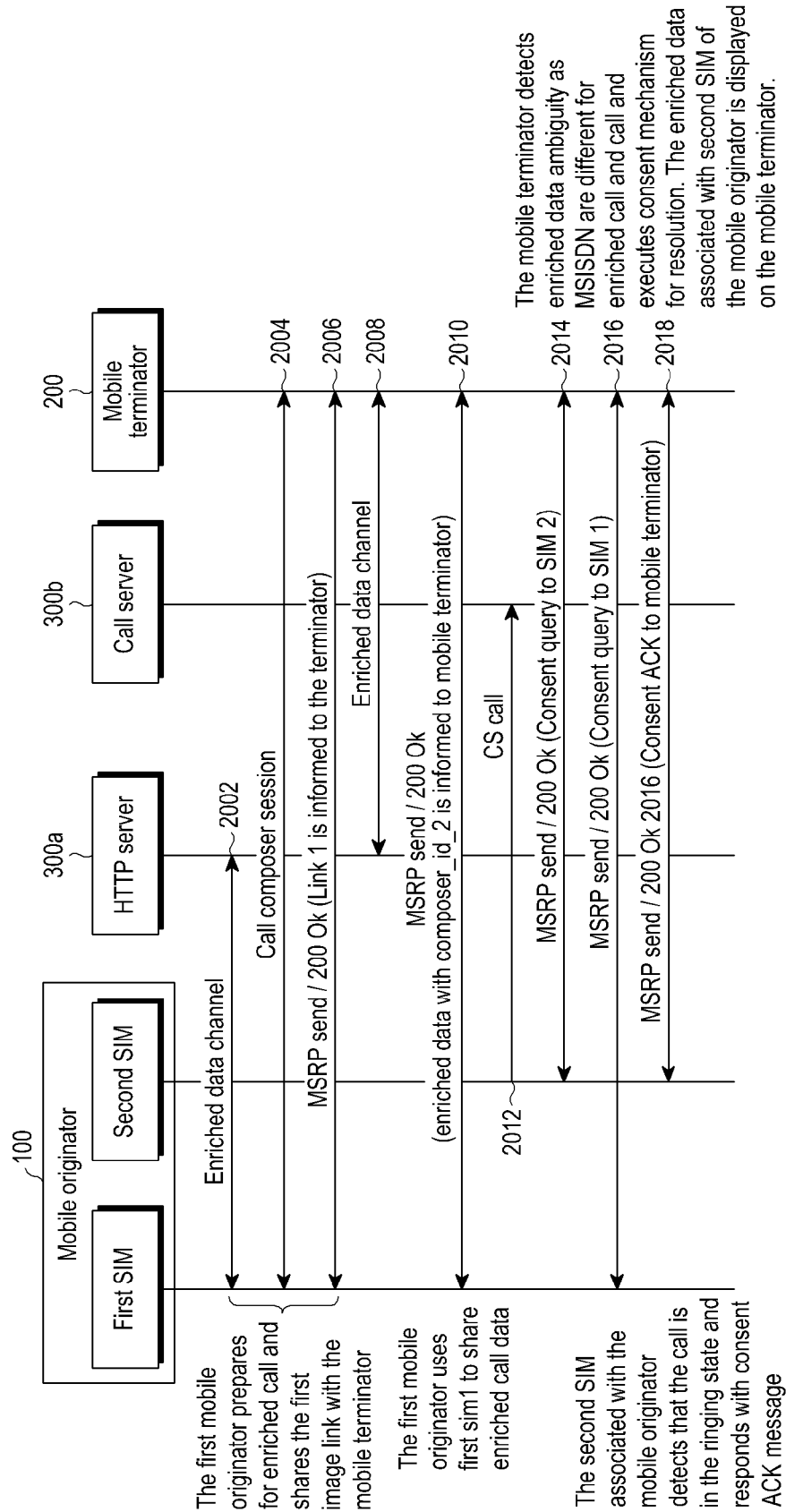

[Fig. 21]
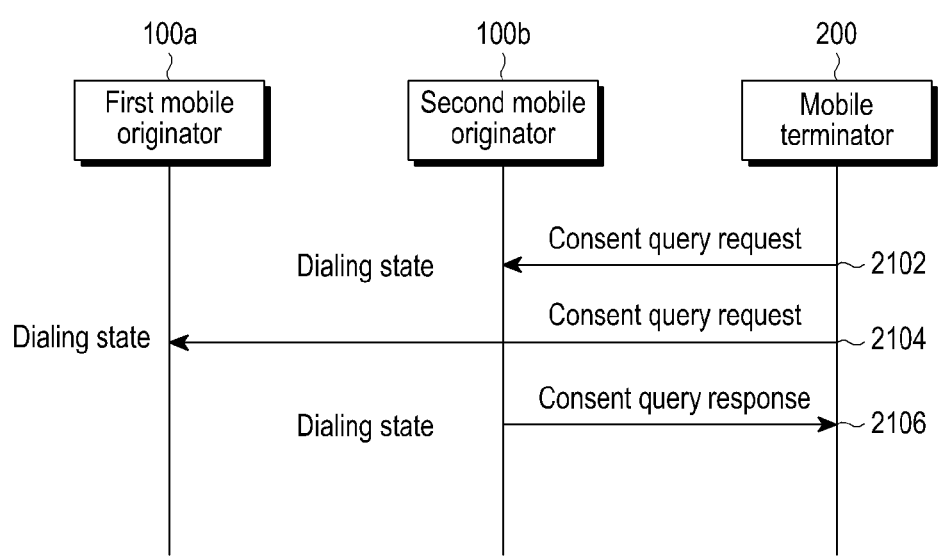

METHOD AND SYSTEM FOR MANAGING ENRICHED CALL DATA IN COMMUNICATION NETWORK

CROSS-REFERENCE TO RELATED APPLICATIONS

This application is a 371 of International Application No. PCT/KR2017/012026 filed on Oct. 27, 2017, which claims priority to India Patent Application No. 201641037100 filed on Oct. 28, 2016, and India Patent Application No. 201641037100 filed on Oct. 25, 2017, the disclosures of which are herein incorporated by reference in their entirety.

BACKGROUND

1. Field

The present disclosure relates to a communication network, and more specifically related to a method and apparatus for managing enriched call data in a communication network.

2. Description of Related Art

A Rich Communication Services (RCS) enriched calling feature offers possibility for a user to provide contextual information of an incoming call to a remote user. This helps in attracting remote user's attention. Further, the RCS enriched calling feature offers possibility for the user to receive the contextual information of the call that helps in making a better decision about the incoming call. But, as per current mechanism, a device supporting RCS is only capable of handling only single-instance Mobile Originated (MO)-single instance Mobile Terminated (MT) user (e.g., 1 IMPI-1 IMPU). Thus, the current RCS enriched calling mechanism fails to support the below mentioned scenario:

Multi-device/Multi-Instance User (1 IMPI multiple IMPUs),

Sender of a mobile originator choosing to hide its identity, and

Sender of the mobile originator uses different Mobile Station International Subscriber Directory Numbers (MSISDNs) to share a RCS enriched data and a voice call.

Consider an example, in which a mobile terminator detects that the mobile terminator receives one or more active enriched RCS data and an incoming voice call but the mobile terminator is unable to select a correct enriched RCS data to be displayed to an end user for the incoming voice call. Further, an enriched RCS data ambiguity is observed in an anonymous call scenario, multi-device call scenario, and an unknown call scenario.

In the anonymous call scenario, an MSISDN of a user of the mobile originator is not available at the mobile terminator to associate the enriched RCS data to the incoming call.

In the multi-device call scenario, the MSISDN of the user of the mobile originator is not sufficient to associate the RCS enriched data to the incoming call as different devices of same user share the same MSISDN.

In the unknown call scenario, the MSISDN of the user of the mobile originator is not sufficient to associate the RCS enriched data to the incoming call as the MSISDN provided in the incoming call may be different.

Thus, it is desired to address the above mentioned disadvantages or other shortcomings or at least provide a useful alternative.

An aspect of the present disclosure is to provide a method and apparatus for managing an enriched call data in a communication network.

Another aspect of the present disclosure is to receive, by a mobile terminator, at least one voice call data including a header having a unique composer identifier from at least one mobile originator.

Another aspect of the present disclosure is to map, by the mobile terminator, the at least one voice call data to an enriched call data based on a unique composer identifier.

Another aspect of the present disclosure is to identify, by the mobile terminator, an association of the at least one mobile originator with the enriched call data and the at least one voice call data based on the mapping.

Another aspect of the present disclosure is to form a unique composer identifier by enriching a composer identifier field present in a call composer schema application with device information of the at least one mobile originator.

Another aspect of the present disclosure is to provide the header included in a SIP message to create a unique association of the enriched call data and the voice call data.

Another aspect of the present disclosure is to send, by the mobile terminator, a consent query request to the mobile originator.

Another aspect of the present disclosure is to receive, by the mobile terminator, a consent query response from the at least one mobile originator.

Another aspect of the present disclosure is to identify, by the mobile terminator, the association of the at least one mobile originator with the enriched call data and the at least one voice call data based on the consent query response.

SUMMARY

Accordingly the embodiments herein disclose a method for managing enriched call data in a communication network. The method includes receiving, by a mobile terminator, an enriched call data from at least one enriched data channel. Further, the method includes receiving, by the mobile terminator, at least one voice call data from at least one voice data channel from at least one mobile originator. The at least one voice call data includes a header including a unique composer identifier. Further, the method includes mapping, by the mobile terminator, the at least one voice call data to the enriched call data based on the unique composer identifier. Furthermore, the method includes identifying, by the mobile terminator, an association of the at least one mobile originator with the enriched call data and the at least one voice call data based on the mapping.

In an embodiment, the enriched call data includes an anonymous identifier which hides an identity of at least one mobile originator of the enriched call data when an anonymous enriched call is originated.

In an embodiment, the at least one voice data includes an anonymous identifier which hides an identity of at least one mobile originator of the voice data when an anonymous voice call is originated.

In an embodiment, the enriched call data includes a Mobile Station International Subscriber Directory Number (MSISDN) identifier of the at least one mobile originator of the enriched call data when an enriched call is originated.

In an embodiment, the at least one voice data includes an MSISDN identifier which hides an identity of the at least one mobile originator of the voice data when a voice call is originated.

In an embodiment, the MSISDN identifier of the enriched call data is different than the MSISDN identifier of the at least one voice call data.

In an embodiment, the MSISDN identifier of the enriched call data is same as the MSISDN identifier of the at least one voice call data, when the enriched call is received from the plurality of mobile originator.

In an embodiment, the at least one voice call data is associated with a Voice over Long-Term Evolution (VoLTE) call data.

In an embodiment, the at least one voice call data is associated with a Circuit Switched (CS) call data.

In an embodiment, the header is a P-EData-Info header including a composer identifier field to indicate the unique composer identifier.

In an embodiment, the unique composer identifier is formed by enriching a composer identifier field present in a call composer schema application with device information of the at least one mobile originator.

In an embodiment, the unique composer identifier includes an anonymous identifier and an instance identifier. The instance identifier is determined based on a network information supported by a device of the mobile originator.

In an embodiment, the header is included in a Session Initiation Protocol (SIP) message to create a unique association of the enriched call data and the voice call data.

In an embodiment, the unique association identifies that the enriched call data and the voice call data are originated by same mobile originator.

Accordingly the embodiments herein disclose a method for managing enriched call data in a communication network. The method includes receiving, by a mobile terminator, an enriched call data from at least one enriched data channel. Further, the method includes receiving, by the mobile terminator, at least one voice call data from at least one voice data channel from at least one mobile originator. Further, the method includes sending, by the mobile terminator, a consent query request to the mobile originator. Further, the method includes receiving, by the mobile terminator, a consent query response from the at least one mobile originator. Further, the method includes identifying, by the mobile terminator, an association of the at least one mobile originator with the enriched call data and the at least one voice call data based on the consent query response.

Accordingly the embodiments herein disclose a method for managing enriched call data in a communication network. The method includes receiving, by a mobile terminator, an enriched call data associated with a first contact number of a mobile originator. Further, the method includes receiving, by the mobile terminator, a voice call data from a second contact number of the mobile originator. Further, the method includes generating and sending, by the mobile terminator, a consent query request to the first contact number of the mobile originator. Further, the method includes receiving, by the mobile terminator, a consent query response from the second contact number of the mobile originator. Further, the method includes identifying, by the mobile terminator, an association of the at least one mobile originator with the enriched call data and the voice call data based on the consent query response.

Accordingly the embodiments herein disclose a method for managing enriched call data in a communication network. The method includes sending, by a mobile originator, an enriched call data over at least one enriched data channel. Further, the method includes composing, by the mobile originator, a header including a unique composer identifier. The unique composer identifier is used to identify an association between the enriched call data and a voice call data of the mobile originator. Further, the method includes sending, by the mobile originator, the voice call data including the header over at least one voice data channel to a mobile terminator.

Accordingly the embodiments herein disclose a method for managing enriched call data in a communication network. The method includes sending, by a mobile originator, an enriched call data from a first contact number to a mobile terminator. Further, the method includes receiving, by the mobile originator, a voice call data from a second contact number to the mobile terminator. Further, the method includes sending, by the mobile originator, a consent query request to the first contact number of the mobile originator. Further, the method includes receiving, by the mobile originator, a consent query response from the second contact number of the mobile originator. The consent query response is used to identify an association between the enriched call data and the voice call data of the mobile originator.

Accordingly the embodiments herein disclose a method for managing an enriched call data in a communication network. The method includes sending, by a mobile originator, an enriched call data over at least one enriched data channel. Further, the method includes sending, by the mobile originator, at least one voice call data over at least one voice data channel to a mobile terminator. Further, the method includes receiving, by the mobile originator, a consent query request from the mobile terminator. Further, the method includes sending, by the mobile originator, a consent query response to the mobile terminator. The consent query response is used to identify the association between the enriched call data and the voice call data of the mobile originator.

Accordingly the embodiments herein disclose a mobile terminator for managing enriched call data in a communication network. The mobile terminator includes an enriched data controller coupled to a memory and a processor. The enriched data controller is configured to receive the enriched call data from at least one enriched data channel. Further, the enriched data controller is configured to receive at least one voice call data from at least one voice data channel from at least one mobile originator. The at least one voice call data includes a header including a unique composer identifier. Further, the enriched data controller is configured to map the at least one voice call data to the enriched call data based on the unique composer identifier. Further, the enriched data controller is configured to identify an association of the at least one mobile originator with the enriched call data and the at least one voice call data based on the mapping.

Accordingly the embodiments herein disclose a mobile terminator for managing enriched call data in a communication network. The mobile terminator includes an enriched data controller coupled to a memory and a processor. The enriched data controller is configured to receive an enriched call data from at least one enriched data channel. Further, the enriched data controller is configured to receive at least one voice call data from at least one voice data channel from at least one mobile originator. Further, the enriched data controller is configured to send a consent query request to the mobile originator. Further, the enriched data controller is configured to receive a consent query response from the at least one mobile originator. Further, the enriched data controller is configured to identify an association of the at least one mobile originator with the enriched call data and the at least one voice call data based on the consent query response.

Accordingly the embodiments herein disclose a mobile terminator for managing enriched call data in a communication network. The mobile terminator includes an enriched data controller coupled to a memory and a processor. The enriched data controller is configured to receive an enriched call data associated with a first contact number of a mobile originator. Further, the enriched data controller is configured to receive a voice call data from a second contact number of the mobile originator. Further, the enriched data controller is configured to generate and send a consent query request to the first contact number of the mobile originator. Further, the enriched data controller is configured to receive a consent query response from the second contact number of the mobile originator. Further, the enriched data controller is configured to identify an association of the at least one mobile originator with the enriched call data and the voice call data based on the consent query response.

Accordingly the embodiments herein disclose a mobile originator for managing enriched call data in a communication network. The mobile originator includes an enriched data controller coupled to a memory and a processor. The enriched data controller is configured to send an enriched call data over at least one enriched data channel. Further, the enriched data controller is configured to compose a header including a unique composer identifier. The unique composer identifier is used to identify an associated between the enriched call data and a voice call data of the mobile originator. Further, the enriched data controller is configured to send the voice call data including the header over at least one voice data channel to a mobile terminator.

Accordingly the embodiments herein disclose a mobile originator for managing enriched call data in a communication network. The mobile originator includes an enriched data controller coupled to a memory and a processor. The enriched data controller is configured to send an enriched call data from a first contact number to a mobile terminator. Further, the enriched data controller is configured to receive a voice call data from a second contact number to the mobile terminator. Further, the enriched data controller is configured to send a consent query request to the first contact number of the mobile originator. Further, the enriched data controller is configured to receive a consent query response from the second contact number of the mobile originator. The consent query response is used to identify an associated between the enriched call data and the voice call data of the mobile originator.

Accordingly the embodiments herein disclose a mobile originator for managing enriched call data in a communication network. The mobile originator includes an enriched data controller coupled to a memory and a processor. The enriched data controller is configured to send the enriched call data over at least one enriched data channel. Further, the enriched data controller is configured to send at least one voice call data over at least one voice data channel to a mobile terminator. The enriched data controller is configured to receive a consent query request from the mobile terminator. The enriched data controller is configured to send a consent query response to the mobile terminator. The consent query response is used to identify the association between the enriched call data and the voice call data of the mobile originator.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which:

FIG. 1 schematically illustrates an enriched calling mechanism when a user of a mobile terminator receives an anonymous call, according to prior art;

FIG. 2 schematically illustrates an enriched calling mechanism when a user of a mobile terminator receives an anonymous enriched call, according to prior art;

FIG. 3 schematically illustrates an enriched calling mechanism when a user of a mobile terminator and a user of mobile originators are in a VoLTE network, according to prior art;

FIG. 4 schematically illustrates an enriched calling mechanism when a user of mobile terminator is in a CS network and a user of mobile originators are in a VoLTE network, according to prior art;

FIG. 5 schematically illustrates an enriched calling mechanism when one of a user of mobile originators and a user of a mobile terminator are in a CS network according to prior art;

FIG. 6 schematically illustrates an enriched calling mechanism when a mobile originator includes a dual SIM, according to prior art;

FIG. 7 is an overview of a system for managing enriched call data in a communication network, according to an embodiment of the present disclosure;

FIG. 8 is a block diagram of a mobile originator, according to an embodiment of the present disclosure;

FIG. 9 is a block diagram of a mobile terminator, according to an embodiment of the present disclosure;

FIG. 10 is a flow diagram illustrating various operations, performed by a mobile terminator, for managing enriched call data in a communication network, according to an embodiment of the present disclosure;

FIG. 11 is a flow diagram illustrating various operations, performed by a mobile terminator, for managing enriched call data in a communication network, when a user of a mobile terminator is in a CS network and a user of mobile originators are in a VoLTE network, according to an embodiment of the present disclosure;

FIG. 12 is a flow diagram illustrating various operations, performed by a mobile terminator, for managing enriched call data in a communication network, when a mobile originator includes a dual SIM, according to an embodiment of the present disclosure;

FIG. 13 is a flow diagram illustrating various operations, performed by a mobile originator, for managing enriched call data in a communication network, according to an embodiment of the present disclosure;

FIG. 14 is a flow diagram illustrating various operations, performed by a mobile originator, for managing enriched call data in a communication network, when a mobile originator includes a dual SIM, according to an embodiment of the present disclosure;

FIG. 15 is a flow diagram illustrating various operations, performed by a mobile originator, for managing enriched call data in a communication network, when a user of mobile terminator is in a CS network and users of mobile originators are in a VoLTE network, according to an embodiment of the present disclosure;

FIG. 16 is sequence diagram illustrating various operations for managing enriched call data in a communication network, when a mobile terminator receives an anonymous call, according to an embodiment of the present disclosure;

FIG. 17 is sequence diagram illustrating various operations for managing enriched call data in a communication network, when a mobile terminator receives an anonymous CS call, according to an embodiment of the present disclosure;

FIG. 18 is sequence diagram illustrating various operations for managing enriched call data in a communication network, when a mobile terminator receives an anonymous call from a user of a first mobile originator and a user of a second mobile originator at a same time, according to an embodiment of the present disclosure;

FIG. 19 is sequence diagram illustrating various operations for managing enriched call data in a communication network, when a mobile terminator receives an anonymous CS call, according to an embodiment of the present disclosure;

FIG. 20 is sequence diagram illustrating various operations for managing enriched call data in a communication network, when a mobile terminator receives an anonymous CS call from a dual SIM of a mobile originator, according to an embodiment of the present disclosure; and FIG. 21 is sequence diagram illustrating various operations for managing enriched call data in a communication network based on a consent query mechanism, according to an embodiment of the present disclosure.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, one of a mobile originator and a mobile terminator may be, for example, a device. Here, the term device may be interchangeable with a user equipment (UE), a mobile station (MS), terminal, mobile device, user device, user terminal, and/or the like.

An apparatus and method proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a $3_{rd}$ generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an evolved packet system (EPS), and a mobile internet protocol (Mobile IP) system, and/or the like.

The below are the basic definition for used terminology in the disclosure.

Anonymous call: The calls are known as anonymous calls whenever a user of the mobile originator decides to hide its identity for given call.

Unknown call: The calls are identified as the unknown call whenever a user of the mobile terminator identifies that it has received the enriched data from the number different than the one it has received call from.

Multi-Device scenario: Whenever the user of the multi-device attempts to make the call from more than one device at the same time, the user of the mobile terminator detects it challenging to create an association between the enriched data and the incoming call during the enriched calling as a Mobile Station International Subscriber Directory Number (MSISDN) is same for all the device instances.

RCS AA: The mobile originator supports a Rich Communication Services (RCS) service and a Voice over Long-Term Evolution (VoLTE) service at the given moment.

RCS Circuit Switched (CS): The mobile originator supports the RCS service and the CS service at the given moment.

The embodiments herein achieve a method for managing enriched call data in a communication network. The method includes receiving, by a mobile terminator, an enriched call data from at least one enriched data channel. Further, the method includes receiving, by the mobile terminator, at least one voice call data from at least one voice data channel from at least one mobile originator. The at least one voice call data includes a header including a unique composer identifier. Further, the method includes mapping, by the mobile terminator, the at least one voice call data to the enriched call data based on the unique composer identifier. Furthermore, the method includes identifying, by the mobile terminator, an association of the at least one mobile originator with the enriched call data and the at least one voice call data based on the mapping.

The proposed method can be used to resolve enriched data ambiguity during the multi-device scenario/the anonymous call scenario/the unknown call scenario/a private call scenario to enable an enriched calling service. This results in improving a uniform user experience. The proposed method can be used to provide a platform to the user to share a feedback or alert a public safety and security framework by enabling the enrich call service in the anonymous call (e.g., Calling line identification restriction (CLIR) call). The method can be used to enable the use of the enriched calling in Mission critical Push to talk calls.

The method can be used to manage the enriched call data in a communication network (e.g., internet protocol (IP) multimedia subsystem (IMS) network) in a simple and effective manner as the method does not require any additional session establishment. The method can be used to manage the enriched call data in the communication network without sharing any sensitive data with other users of the mobile terminator, while establishing the enriched call. The method can be used to manage the enriched call data in the communication network without any modification in a network side.

Unlike conventional systems and the methods, the proposed method can be used to eliminate an ambiguity of the enriched data to be displayed for the received call in the multi-device scenario. The proposed method can be used to eliminate the ambiguity of the enriched data to be displayed for received call in the anonymous/private/unknown call scenarios. The proposed method can be used to eliminate the resource wastage incurred while downloading image files on all the device instances of a receiver.

The proposed method provides the enriched calling support in the multi-device scenario. The proposed method can be used to map the incoming call to the enriched data received from a correct originating device instance of a multi-device user in a RCS AA-RCS AA scenario The proposed method can be used to map the incoming call to the enriched data received from the correct originating device instance of the multi-device user in the RCS AA-RCS CS scenario.

Referring now to the drawings, and more particularly to FIGS. 7 through 21, where similar reference characters denote corresponding features consistently throughout the figures, there are shown preferred embodiments.

FIG. 1 schematically illustrates an enriched calling mechanism when a user of a mobile terminator receives an anonymous call, according to prior art.

As shown in FIG. 1, a user of the first mobile originator 100*a* perceives an accident on a road and decides to report the accident to a public service agency but, the user of the first mobile originator 100*a* does not want himself/herself to be bothered anymore in this regards, so that the user of the first mobile originator 100*a* decides to make anonymous normal call to the public service agency.

A user of the second mobile originator 100*b* calls the public service agency reporting some usual queries about security services in his/her locality. The user of the second mobile originator 100*b* chooses to hide his/her identity. The user of the second mobile originator 100*b* marks the call with a medium urgency level and prefers to make an anonymous enriched call. This incident happens at two different places but almost same time the call received at the mobile terminator 200. In this scenario, in existing methods, there is no mechanism to map the enriched call data to incoming call as the user of the first mobile originator 100*a* and the user of the second mobile originator 100*b* have hidden its identity. This results reducing the user experience.

FIG. 2 schematically illustrates enriched calling mechanism when a user of a mobile terminator receives an anonymous enriched call, according to prior art.

As shown in FIG. 2, the user of the mobile originator 100*a* perceives the accident on the road and decides to report the accident to the public service agency. The user of the mobile originator 100*a* does not want himself/herself to be bothered anymore in this regard, so that the user of the first mobile originator 100*a* decides to make anonymous enriched call to the public service agency. The user of the second mobile originator 100*b* perceives a fire in his/her neighborhood and decides to report the issue to the public service agency but the user of the second mobile originator 100*b* does not want himself/herself to be bothered anymore, so that the user of the second mobile originator 100*b* chooses to make anonymous enriched call. This incident happens at two different places but almost same time. In current methods, there is no mechanism to map the enriched call data to incoming call as the user of the mobile originator 100*a* and the user of the mobile originator 100*b* have hidden its identity. This results in reducing the user experience.

FIG. 3 schematically illustrates an enriched calling mechanism when a user of a mobile terminator and a user of mobile originators are in a VoLTE network, according to prior art.

As shown in FIG. 3, consider the scenario, the user of the mobile originator 100*a*, the user of the mobile originator 100*b*, and the user of the mobile terminator 200 are in the VoLTE network. The user of the mobile originator 100*a* meets with the accidents and calls the user of the mobile terminator 200 who is outdoor for work. The user of the mobile originator 100*b* want to ask the user of the mobile terminator 200 bring cookies and calls for the same at the same time. The user of the mobile terminator 200 receives the enriched call data from two different instances from the user of the mobile originator 100*a* and the user of the mobile originator 100*b*, so that there is ambiguity faced by the user of the mobile terminator 200 in terms of what data to be shown in the mobile terminator 200. This results in reducing the user experience.

FIG. 4 schematically illustrates an enriched calling mechanism when a user of a mobile terminator is in a CS network and a user of mobile originators are in a VoLTE network, according to prior art.

As shown in FIG. 4, consider the scenario, the user of the mobile originator 100*a* and the user of the mobile originator 100*b* are in the VoLTE network. The user of the mobile terminator 200 is in the CS network. The user of the mobile originator 100*a* meets with the accidents and calls the user of the mobile terminator 200 who is outdoor for the work. The user of the mobile originator 100*b* want to ask to the user of the mobile terminator 200 bring cookies and calls for the same at the same time. The user of the mobile terminator 200 receives the enriched call data from the user of the mobile originator 100*a* and the user of the mobile originator 100*b*, so that there is huge ambiguity faced by the user of the mobile terminator 200 in terms of what data to be shown on the mobile terminator 200. This results in reducing the user experience.

FIG. 5 schematically illustrates an enriched calling mechanism when one of a user of mobile originators and a user of a mobile terminator are in a CS network according to prior art.

As shown in FIG. 5, consider the scenario, the user of the mobile originator 100*a* and the user of the mobile terminator 200 are in the CS network. The user of the mobile originator 100*b* are in the VoLTE network. The user of the mobile originator 100*a* meets with the accidents and calls the user of the mobile terminator 200 who is outdoor for the work. The user of the mobile originator 100*b* want to ask to the user of the mobile terminator 200 bring cookies and calls for the same at the same time. The user of the mobile terminator 200 receives the enriched call data from the user of the mobile originator 100*a* and the user of the mobile originator 100*b*, so that there is ambiguity faced by the user of the mobile terminator 200 in terms of what data to be shown on the mobile terminator 200. This results in reducing the user experience.

FIG. 6 schematically illustrates an enriched calling mechanism when a mobile originator includes a dual SIM, according to prior art.

As shown in FIG. 6, consider the scenario, the mobile originator 100*a* has the dual SIM, where the first SIM from the dual SIM supports a RCS service and the second SIM from the dual SIM supports a VoLTE service. The user of the mobile terminator 200 has a SIM supporting the RCS service and the VoLTE service. The user of the mobile originator 100*a* is calling to the user of the mobile terminator 200. In the current methods, there is no mechanism to map the enriched call data to incoming call. This results in reducing the user experience.

FIG. 7 is an overview of a system for managing enriched call data in a communication network, according to an embodiment of the present disclosure.

Referring to FIG. 7, in an embodiment, the system 1000 includes a set of mobile originators 100*a*-100*n*, the mobile terminator 200 and a server 300. The mobile originators 100*a*-100*n* are communicated with the mobile terminator 200 through the server 300. The mobile originators 100*a*-100*n* and the mobile terminator 200 can be, for example, but not limited to a smart phone, a laptop, a Personal Digital Assistance (PDA), a smart watch or the like.

In an embodiment, the mobile terminator 200 is configured to receive the enriched call data from at least one enriched data channel. Further, the mobile terminator 200 is configured to receive at least one voice call data from at least one voice data channel from at least one mobile originators 100*a*-100*n*. The at least one voice call data includes a header having a unique composer identifier.

Based on the unique composer identifier, the mobile terminator 200 is configured to map the at least one voice call data to the enriched call data. After mapping the at least one voice call data to the enriched call data, the mobile terminator 200 is configured to identify an association of the at least one mobile originator 100*a* or 100*b* with the enriched call data and the at least one voice call data.

In an embodiment, the enriched call data includes an anonymous identifier that hides an identity of at least one mobile originator 100*a*-100*n* of the enriched call data when an anonymous enriched call is originated.

In an embodiment, the at least one voice data includes an anonymous identifier that hides an identity of at least one mobile originator 100*a*-100*n* of the voice data when an anonymous voice call is originated.

In an embodiment, the enriched call data includes an MSISDN identifier of at least one mobile originator 100*a*-100*n* of the enriched call data when an enriched call is originated.

In an embodiment, the at least one voice data includes an MSISDN identifier which hides an identity of at least one mobile originator 100*a*-100*n* of the voice data when a voice call is originated.

In an embodiment, the MSISDN identifier of the enriched call data is different than the MSISDN identifier of the at least one voice call data.

In an embodiment, the MSISDN identifier of the enriched call data is same as the MSISDN identifier of the at least one voice call data, when the enriched call is received from a plurality of mobile originator 100*a*-100*n*.

In an embodiment, the at least one voice call data is associated with VoLTE call data. In another embodiment, the at least one voice call data is associated with CS call data.

In an embodiment, the header is a P-EData-Info header including a composer identifier field to indicate the unique composer identifier.

In an embodiment, the P-EDATA-INFO header in a VoLTE call invite message to uniquely map the incoming call to the enriched data received from correct call-originating-user-instance in case of a SIP call.

In an embodiment, the unique composer identifier is generated by enriching a composer identifier field present in a call composer schema application with device information of the at least one mobile originator 100*a*-100*n*.

In an embodiment, the unique composer identifier includes an anonymous identifier and an instance identifier. The instance identifier is determined based on a network information supported by the mobile originator 100*a*.

In an embodiment, the header is included in a SIP message to create a unique association of the enriched call data and the voice call data.

In an embodiment, the unique association identifies that the enriched call data and the voice call data are originated by same mobile originator 100*a*.

In an example, composer ID field present in the call composer schema application/vnd.gsma.encall+xml will be enriched with device information example gruu tag or sip instance to form a unique composer ID across multiple instances of the user.

Composer Id: "string1string2?, where string1: 5 character long random string and string 2: can be gruu or instance id depending upon RCS network support Example 1: 12345kjh29x97us97d (where kjh29x97us97d comes from pub gruu sip:alice@example.com;gr=kjh29x97us97d received in 2OOOK of INVITE)

Example 2: 12345f81d4fae-7dec-11d0-a765-00a0c91-e6bf6 (where f81d4fae-7dec-11d0-a765-00a0c91e6bf6 is sip instance ID)

In an embodiment, the composer ID information needs to be included as the P-EData-Info header in a SIP call invite message to create a unique association of the enriched data and a Call invite message.

Below is an example of the call composer schema application (e.g., application/vnd.gsma.encall+xml SCHEMA application):

```
<!-- The root "rcsenvelope" element -->
<xs:element name="rcsenvelope">
<xs:complexType>
<xs:sequence>
<xs:element name="rcscalldata" type="reasontype" maxOccurs="1"/>
<xs:any minOccurs="0" maxOccurs="unbounded" processContents="lax"/>
</xs:sequence>
</xs:complexType>
</xs:element>
<!-- The definition of type "reasontype" is as below -->
<xs:complexType name="reasontype">
<xs:sequence>
<xs:element name="subject" type="xs:string" minOccurs="0" maxOccurs="1"/>
<xs:element name="importance" type="xs:boolean" minOccurs="0" maxOccurs="1"/>
<xs:element name="location" type="xs:string" minOccurs="0" maxOccurs="1"/>
<xs:element name="composerid" type="xs:string" minOccurs="0" maxOccurs="1"/>
<xs:element name="picture_url" type="xs:string" minOccurs="0" maxOccurs="1"/>
<xs:element name="note" type="xs:string" minOccurs="0" maxOccurs="1"/>
```

```
<xs:element name="consent" type="xs:boolean" minOccurs="0" maxOccurs="1"/>
<xs:any minOccurs="0" maxOccurs="unbounded" processContents="lax"/>
</xs:sequence>
</xs:complexType>
</xs:schema>
```

In an example, the user of the first mobile originator 100*a* perceives the accident on the road and decides to report the accident to the public service agency but, the user of the first mobile originator 100*a* does not want himself/herself to be bothered anymore in this regards, so that the user of the first mobile originator 100*a* decides to make anonymous normal call to the public service agency. The user of the second mobile originator 100*b* calls the public service agency reporting some usual queries about security services in his/her locality. The user of the second mobile originator 100*b* chooses to hide his/her identity. The user of the second mobile originator 100*b* marks the call with the medium urgency level and prefers to make the anonymous enriched call. This incidents happens at two different places but almost same time the call received at the mobile terminator 200. Based on the proposed method, the method can be used to map the enriched call data to the incoming call based on the P-EData-Info header. This results in enhancing the user experience.

In another example, the user of the mobile originator 100*a* perceives the accident on the road and decides to report the accident to the public service agency. The user of the mobile originator 100*a* does not want himself/herself to be bothered anymore in this regards, so that the user of the mobile originator 100*a* decides to make anonymous enriched call to the public service agency. The user of the mobile originator 100*b* perceives the flood in his/her neighborhood and decides to report the issue the public service agency but the user of the mobile originator 100*b* does not want himself/ herself to be bothered anymore, so that the user of the mobile originator 100*b* chooses to make anonymous enriched call. This incidents happens at two different places but almost same time. Based on the proposed method, the method can be used to map the enriched call data to the incoming call based on the P-EData-Info header. This results in enhancing the user experience.

In another example, consider the scenario, the user of the mobile originator 100*a*, the user of the mobile originator 100*b*, and the user of the mobile terminator 200 are in the VoLTE network. The user of the mobile originator 100*a* meets with the accidents and calls the user of the mobile terminator 200 who is outdoor for work. The user of the mobile originator 100*b* want to ask the user of the mobile terminator 200 bring cookies and calls for the same at the same time. The user of the mobile terminator 200 receives the enriched call data from two different instances from the user of the mobile originator 100*a* and the user of the mobile originator 100*b*. Based on the proposed method, the method can be used to map the enriched call data to the incoming call based on the P-EData-Info header. This results in enhancing the user experience.

In an embodiment, the mobile terminator 200 is configured to receive the enriched call data from at least one enriched data channel. Further, the mobile terminator 200 is configured to receive at least one voice call data from at least one voice data channel from at least one mobile originator 100*a*-100*n*. After receiving at least one voice call data, the mobile terminator 200 is configured to send a consent query request to the mobile originator 100*a* or 100*b* or 100*n*. In response to the consent query request, the mobile terminator 200 is configured to receive a consent query response from the at least one mobile originator 100*a*-100*n*. Based on the consent query response, the mobile terminator 200 is configured to identify the association of the at least one mobile originator 100*a* or 100*b* or 100*n* with the enriched call data and the at least one voice call data.

In an example, the user of the mobile originator 100*a* and the user of the mobile originator 100*b* are in the VoLTE network. The user of the mobile terminator 200 is in the CS network. The user of the mobile originator 100*a* meets with the accidents and calls the user of the mobile terminator 200 who is outdoor for the work. The user of the mobile originator 100*b* want to ask to the user of the mobile terminator 200 bring cookies and calls for the same at the same time. The user of the mobile terminator 200 receives the enriched call data from the user of the mobile originator 100*a* and the user of the mobile originator 100*b*. In the proposed method, the user of the mobile terminator 200 detects the enriched data ambiguity and executes the consent query mechanism for resolution. The details of the consent mechanism is explained in FIG. 21. Based on the consent query mechanism, the user of the mobile terminator 200 determines the association of the at least one mobile originator 100*a* or 100*b* with the enriched call data and the at least one voice call data. This results in enhancing the user experience.

In another example, the user of the mobile originator 100*a* and the user of the mobile terminator 200 are in the CS network. The user of the mobile originator 100*b* are in the VoLTE network. The user of the mobile originator 100*a* meets with the accidents and calls the user of the mobile terminator 200 who is outdoor for the work. The user of the mobile originator 100*b* want to ask to the user of the mobile terminator 200 bring cookies and calls for the same at the same time. The user of the mobile terminator 200 receives the enriched call data from the user of the mobile originator 100*a* and the user of the mobile originator 100*b*. In the proposed method, the user of the mobile terminator 200 detects the enriched data ambiguity and executes the consent query mechanism for resolution. Based on the consent query mechanism, the user of the mobile terminator 200 determines the association of the at least one mobile originator 100*a* or 100*b* with the enriched call data and the at least one voice call data. This results in enhancing the user experience.

In an embodiment, the mobile terminator 200 is configured to receive the enriched call data associated with the first contact number of the mobile originator 100*a*. Further, the mobile terminator 200 is configured to receive the voice call data from a second contact number of the mobile originator 100*a*. After receiving the voice call data from the second contact number of the mobile originator 100*a*, the mobile terminator 200 is configured to generate and send the consent query request to the first contact number of the mobile originator 100*a*. In response to the consent query request, the mobile terminator 200 is configured to receive the consent query response from the second contact number of the mobile originator 100a. In response to the consent query response, the mobile terminator 200 is configured to identify the association of the at least one mobile originator 100a or 100b with the enriched call data and the voice call data.

In an embodiment, the consent query response can be used to uniquely map the incoming call to the enriched data received from correct call-originating-user-instance in case of the CS Call or for a network that does not support the P-EDATA-INFO.

In an embodiment, the consent query request and the consent query response are an additional Message Session Relay Protocol (MSRP) signaling that takes place over an existing composer channel whenever the incoming call is received and the mobile terminator 200 detects the enriched data ambiguity. Whenever the mobile terminator 200 receives the call over a CS interface or a VoLTE call without the P-EData-Info header, decision to choose stored enriched data for the incoming call, depends on the additional consent provided by the mobile originator 100a.

In an embodiment, the mobile terminator 200 sends consent query signals to all the remote mobile originators 100a-100n with whom it has active composer channels.

One of the mobile originators 100a-100n whose call enters in a ringing state and responds to the mobile terminator 200 in a form of CONSENT ACK. The mobile terminator 200 displays the RCS enriched data of the mobile originators 100a who responds with the CONSENT ACK.

Consider the scenario, the mobile originator 100a has the dual SIM, where the first SIM from the dual SIM supports the RCS service and the second SIM from the dual SIM supports the VoLTE service. The user of the mobile terminator 200 has the SIM supporting the RCS service and the VoLTE service. The user of the mobile originator 100a is calling to the user of the mobile terminator 200. In the proposed method, the user of the mobile terminator 200 detects the enriched data ambiguity and executes the consent query mechanism for resolution. Based on the consent query mechanism, the user of the mobile terminator 200 determines the association of the at least one mobile originator 100a or 100b with the enriched call data and the at least one voice call data. This results in enhancing the user experience.

In an embodiment, the mobile originator 100a is configured to send the enriched call data over at least one enriched data channel. Further, the mobile originator 100a is configured to compose the header including the unique composer identifier. The unique composer identifier is used to identify the association between the enriched call data and the voice call data of the mobile originator 100a. Further, the mobile originator 100a is configured to send the voice call data including the header over at least one voice data channel to the mobile terminator 200.

In an embodiment, the mobile originator 100a is configured to send the enriched call data from a first contact number to the mobile terminator 200. Further, the mobile originator 100a is configured to receive the voice call data from a second contact number to the mobile terminator 200. After receiving the voice call data, the mobile originator 100a is configured to send the consent query request to the first contact number of the terminator 200. In response to the consent query request, the mobile originator 100a is configured to receive the consent query response from the second contact number of the mobile terminator 200. The consent query response is used to identify the association between the enriched call data and the voice call data of the mobile originator 100a.

Although the FIG. 7 show overview of the system 1000 but it is to be understood that other embodiments are not limited thereon. In other embodiments, the system 1000 may include less or more number of components. Further, the labels or names of the components are used only for illustrative purpose and does not limit the scope of the invention.

FIG. 8 is a block diagram of a mobile originator, according to an embodiment of the present disclosure.

Referring to FIG. 8, in an embodiment, the mobile originator 100 includes an enriched data controller 110, a communicator 120, a memory 130, and a processor 140.

In an embodiment, the enriched data controller 110 is configured to send the enriched call data over at least one enriched data channel. Further, the enriched data controller 110 is configured to compose the header including the unique composer identifier. The unique composer identifier is used to identify the association between the enriched call data and the voice call data of the mobile originator 100a. Further, the enriched data controller 110 is configured to send the voice call data including the header over at least one voice data channel to the mobile terminator 200.

In an embodiment, the enriched data controller 110 sends the enriched call data over at least one enriched data channel. The enriched data controller 110 sends at least one voice call data over at least one voice data channel to the mobile terminator 200. The enriched data controller 110 receives the consent query request from the mobile terminator 200. The enriched data controller 110 sends the consent query response to the mobile terminator 200. The consent query response is used to identify the association between the enriched call data and the voice call data of the mobile originator 100.

Further, the enriched data controller 110 is coupled to the communicator 120, the memory 130 and the processor 140. The processor 140 is configured to execute instructions stored in the memory 130 and to perform various processes. The communicator 120 is configured for communicating internally between internal hardware components and with external devices via one or more networks. The communicator 120 is configured for communicating with the enriched data controller 110 to manage the enriched call data in the communication network.

The memory 130 also stores instructions to be executed by the processor 140. The memory 130 also stores instruction to map the at least one voice call data to the enriched call data. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In some examples, the memory 130 can be configured to store larger amounts of information than the memory. In certain examples, a non-transitory storage medium may store data that can, over time, change (e.g., in Random Access Memory (RAM) or cache).

Although the enriched data controller 110, the communicator 120, the memory 130, and the processor 140 are described as separate units in the mobile originator 100 in FIG. 8, it is to be understood that the mobile originator 100 may be implemented with a form into which at least two of the enriched data controller 110, the communicator 120, the memory 130, and the processor 140 may be incorporated.

Although the FIG. 8 shows various hardware components of the mobile originator 100 but it is to be understood that other embodiments are not limited thereon. In other embodiments, the mobile originator 100 may include less or more number of components. Further, the labels or names of the components are used only for illustrative purpose and does not limit the scope of the invention. One or more components can be combined together to perform same or substantially similar function to manage the enriched call data in the communication network.

FIG. 9 is a block diagram of a mobile terminator, according to an embodiment of the present disclosure.

Referring to FIG. 9, in an embodiment, the mobile terminator 200 includes an enriched data controller 210, a communicator 220, a memory 230, and a processor 240.

In an embodiment, the enriched data controller 210 is configured to receive the enriched call data from the at least one enriched data channel. Further, the enriched data controller 210 is configured to receive the at least one voice call data from at least one voice data channel from at least one mobile originator 100a. The at least one voice call data includes the header having the unique composer identifier. After receiving the at least one voice call data from at least one voice data channel from the at least one mobile originator 100a, the enriched data controller 210 is configured to map the at least one voice call data to the enriched call data based on the unique composer identifier. Based on the mapping, the enriched data controller 210 is configured identify the association of the at least one mobile originator 100a with the enriched call data and the at least one voice call data.

In an embodiment, the enriched data controller 210 is configured to receive the enriched call data from the at least one enriched data channel. The enriched data controller 210 is configured to receive the at least one voice call data from at least one voice data channel from at least one mobile originator 100a. After receiving the at least one voice call data from at least one voice data channel from at least one mobile originator 100a, the enriched data controller 210 is configured to send the consent query request to the mobile originator 100a. Based on the consent query request, the enriched data controller 210 is configured to receive the consent query response from the at least one mobile originator 100a. In response to the consent query response, the enriched data controller 210 is configured to identify the association of the at least one mobile originator 100a with the enriched call data and the at least one voice call data.

In an embodiment, the enriched data controller 210 is configured to receive the enriched call data associated with the first contact number of the mobile originator 100a. Further, the enriched data controller 210 is configured to receive the voice call data from the second contact number of the mobile originator 100a. After receiving the voice call data from the second contact number of the mobile originator 100a, the enriched data controller 210 is configured to generate and send the consent query request to the first contact number of the mobile originator 100a. Based on the consent query request, the enriched data controller 210 is configured to receive the consent query response from the second contact number of the mobile originator 100a. Based on the consent query response, the enriched data controller 210 is configured to identify the association of the at least one mobile originator 100a with the enriched call data and the voice call data.

Further, the enriched data controller 210 is coupled to the communicator 220, the memory 230 and the processor 240. The processor 240 is configured to execute instructions stored in the memory 230 and to perform various processes. The communicator 220 is configured for communicating internally between internal hardware components and with external devices via one or more networks. The communicator 220 is configured for communicating with the enriched data controller 210 to manage the enriched call data in the communication network.

The memory 230 stores mapping information associated with the at least one voice call data to the enriched call. The memory 230 also stores instructions to be executed by the processor 240. The memory 230 may include non-volatile storage elements. Examples of such non-volatile storage elements may include magnetic hard discs, optical discs, floppy discs, flash memories, or forms of EPROM or EEPROM memories. In addition, the memory 230 may, in some examples, be considered a non-transitory storage medium. The term "non-transitory" may indicate that the storage medium is not embodied in a carrier wave or a propagated signal. However, the term "non-transitory" should not be interpreted that the memory 230 is non-movable. In some examples, the memory 230 can be configured to store larger amounts of information than the memory. In certain examples, a non-transitory storage medium may store data that can, over time, change (e.g., in Random Access Memory (RAM) or cache).

Although the enriched data controller 210, the communicator 220, the memory 230, and the processor 240 are described as separate units in the mobile terminator 200 in FIG. 9, it is to be understood that the mobile terminator 200 may be implemented with a form into which at least two of the enriched data controller 210, the communicator 220, the memory 230, and the processor 240 may be incorporated.

Although the FIG. 9 shows various hardware components of the mobile terminator 200 but it is to be understood that other embodiments are not limited thereon. In other embodiments, the terminator 200 may include less or more number of components. Further, the labels or names of the components are used only for illustrative purpose and does not limit the scope of the invention. One or more components can be combined together to perform same or substantially similar function to manage the enriched call data in the communication network.

FIG. 10 is a flow diagram illustrating various operations, performed by a mobile terminator, for managing enriched call data in a communication network, according to an embodiment of the present disclosure.

Referring to FIG. 10, the operations (1002-1008) are performed by the enriched data controller 210 of the mobile terminator 200.

At 1002, the method includes receiving, by the mobile terminator 200, the enriched call data from the at least one enriched data channel. At 1004, the method includes receiving, by the mobile terminator 200, the at least one voice call data from the at least one voice data channel from the at least one mobile originator 100a. The at least one voice call data includes the header having the unique composer identifier. At 1006, the method includes mapping, by the mobile terminator 200, the at least one voice call data to the enriched call data based on the unique composer identifier. At 1008, the method includes identifying, by the mobile terminator 200, the association of the at least one mobile originator 100a with the enriched call data and the at least one voice call data based on the mapping.

The various actions, acts, blocks, steps, or the like in the flow diagram 1000 may be performed in the order presented, in a different order or simultaneously. Further, in some embodiments, some of the actions, acts, blocks, steps, or the like may be omitted, added, modified, skipped, or the like without departing from the scope of the invention.

FIG. 11 is a flow diagram illustrating various operations, performed by a mobile terminator, for managing enriched call data in a communication network, when a user of a mobile terminator is in a CS network and a user of mobile originators are in a VoLTE network, according to an embodiment of the present disclosure.

Referring to FIG. 11, the operations (1102-1110) are performed by the enriched data controller 210 of the mobile terminator 200.

At 1102, the method includes receiving, by the mobile terminator 200, the enriched call data from the at least one enriched data channel. At 1104, the method includes receiving, by the mobile terminator 200, the at least one voice call data from at least one voice data channel from at least one mobile originator 100a. At 1106, the method includes sending, by the mobile terminator 200, the consent query request to the mobile originator 100a. At 1108, the method includes receiving, by the mobile terminator 200, the consent query response from the at least one mobile originator 100a. At 1110, the method includes identifying, by the mobile terminator 200, the association of the at least one mobile originator 100a with the enriched call data and the at least one voice call data based on the consent query response.

The various actions, acts, blocks, steps, or the like in the flow diagram 1100 may be performed in the order presented, in a different order or simultaneously. Further, in some embodiments, some of the actions, acts, blocks, steps, or the like may be omitted, added, modified, skipped, or the like without departing from the scope of the invention.

FIG. 12 is a flow diagram illustrating various operations, performed by a mobile terminator, for managing enriched call data in a communication network, when a mobile originator includes a dual SIM, according to an embodiment of the present disclosure.

Referring to FIG. 12, the operations (1202-1210) are performed by the enriched data controller 210 of the mobile terminator 200.

At 1202, the method includes receiving, by the mobile terminator 200, the enriched call data associated with the first contact number of the mobile originator 100a. At 1204, the method includes receiving, by the mobile terminator 200, the voice call data from the second contact number of the mobile originator 100a. At 1206, the method includes generating and sending, by the mobile terminator 200, the consent query request to the first contact number of the mobile originator 100a. At 1208, the method includes receiving, by the mobile terminator 200, the consent query response from the second contact number of the mobile originator 100a. At 1210, the method includes identifying, by the mobile terminator 200, the association of the at least one mobile originator 100a with the enriched call data and the voice call data based on the consent query response.

The various actions, acts, blocks, steps, or the like in the flow diagram 1200 may be performed in the order presented, in a different order or simultaneously. Further, in some embodiments, some of the actions, acts, blocks, steps, or the like may be omitted, added, modified, skipped, or the like without departing from the scope of the invention.

FIG. 13 is a flow diagram illustrating various operations, performed by a mobile originator, for managing enriched call data in a communication network, according to an embodiment of the present disclosure.

Referring to FIG. 13, the operations (1302-1306) are performed by the enriched data controller 110 of the mobile originator 100.

*202 At 1302, the method includes sending, by the mobile originator 100, the enriched call data over at least one enriched data channel. At 1304, the method includes composing, by the mobile originator 100, the header including the unique composer identifier. The unique composer identifier is used to identify the association between the enriched call data and the voice call data of the mobile originator 100. At 1306, the method includes sending, by the mobile originator 100, the voice call data including the header over at least one voice data channel to the mobile terminator 200.

The various actions, acts, blocks, steps, or the like in the flow diagram 1300 may be performed in the order presented, in a different order or simultaneously. Further, in some embodiments, some of the actions, acts, blocks, steps, or the like may be omitted, added, modified, skipped, or the like without departing from the scope of the invention.

FIG. 14 is a flow diagram illustrating various operations, performed by a mobile originator, for managing enriched call data in a communication network, when a mobile originator includes a dual SIM, according to an embodiment of the present disclosure.

Referring to FIG. 14, the operations (1402-1408) are performed by the enriched data controller 110 of the mobile originator 100.

At 1402, the method includes sending, by the mobile originator 100, the enriched call data from the first contact number to the mobile terminator 200. At 1404, the method includes receiving, by the mobile originator 100, the voice call data from the second contact number to the mobile terminator 200. At 1406, the method includes sending, by the mobile originator 100, the consent query request to the first contact number of the mobile originator 100. At 1408, the method includes receiving, by the mobile originator 100, the consent query response from the second contact number of the mobile originator 100. The consent query response is used to identify the association between the enriched call data and the voice call data of the mobile originator 100.

The various actions, acts, blocks, steps, or the like in the flow diagram 1400 may be performed in the order presented, in a different order or simultaneously. Further, in some embodiments, some of the actions, acts, blocks, steps, or the like may be omitted, added, modified, skipped, or the like without departing from the scope of the invention.

FIG. 15 is a flow diagram illustrating various operations, performed by a mobile originator, for managing enriched call data in a communication network, when users of mobile terminators is in a CS network and a user of a mobile originator are in a VoLTE network, according to an embodiment of the present disclosure.

Referring to FIG. 15, the operations (1502-1508) are performed by the enriched data controller 110 of the mobile originator 100.

At 1502, the method includes sending, by the mobile originator 100, the enriched call data over at least one enriched data channel. At 1504, the method includes sending, by the mobile originator 100, at least one voice call data over at least one voice data channel to the mobile terminator 200. At 1506, the method includes receiving, by the mobile originator 100, a consent query request from the mobile terminator 200. At 1508, the method includes sending, by the mobile originator 100, the consent query response to the mobile terminator 200. The consent query response is used to identify the association between the enriched call data and the voice call data of the mobile originator 100.

The various actions, acts, blocks, steps, or the like in the flow diagram 1500 may be performed in the order presented, in a different order or simultaneously. Further, in some embodiments, some of the actions, acts, blocks, steps, or the like may be omitted, added, modified, skipped, or the like without departing from the scope of the invention.

FIG. 16 is sequence diagram illustrating various operations for managing enriched call data in a communication network, when a mobile terminator receives an anonymous call, according to an embodiment of the present disclosure.

Referring to FIG. 16, consider the scenario, where the user of the first mobile originator 100a makes for the anonymous call to the mobile terminator 200 by providing the enriched call data, the user of the second mobile originator 100b prepares for a normal anonymous call to the mobile terminator 200. The mobile terminator 200 receives the anonymous call.

At 1602, the enriched data channel is established between the first mobile originator 100a and the HTTP server 300a. At 1604, a call composer session is established between the first mobile originator 100a and the mobile terminator 200. At 1606, a MSRP message is exchanged between the first mobile originator 100a and the mobile terminator 200. While exchanging the MSRP message between the first mobile originator 100a and the mobile terminator 200, a link information (e.g., image link, file link or the like) is informed to the mobile terminator 200. At 1608, the enriched data channel is established between the HTTP server 300a and the mobile terminator 200. At 1610, the CS call is established between the second mobile originator 100b and the mobile terminator 200. At 1612, the MSRP message is exchanged between the first mobile originator 100a and the mobile terminator 200. While exchanging the MSRP message between the first mobile originator 100a and the mobile terminator 200, the enriched data with composer_id_is informed to the mobile terminator 200. At 1614, the first mobile originator 100a sends the VoLTE INVITE with the P-EDATA-INFO header set to composer_id_1 to the call server 300a. At 1616, the call server 300a sends the VoLTE call with the P-EDATA-info header to the mobile terminator 200. The mobile terminator 200 utilizes the P-EData-Info header to map the enriched call data to the incoming call.

FIG. 17 is sequence diagram illustrating various operations for managing enriched call data in a communication network, when a mobile terminator receives an anonymous CS call, according to an embodiment of the present disclosure.

Referring to FIG. 17, consider the scenario, where the user of the first mobile originator 100a makes for the anonymous call to the mobile terminator 200 by providing the enriched call data, the user of the second mobile originator 100b prepares for a normal anonymous call to the mobile terminator 200. The mobile terminator 200 receives the anonymous CS call.

At 1702, the enriched data channel is established between the first mobile originator 100a and the HTTP server 300a. At 1704, the call composer session is established between the first mobile originator 100a and the mobile terminator 200. At 1706, the MSRP message is exchanged between the first mobile originator 100a and the mobile terminator 200. While exchanging the MSRP message between the first mobile originator 100a and the mobile terminator 200, the first mobile originator 100a sends the first link information to the mobile terminator 200. At 1708, the enriched data channel is established between the HTTP server 300a and the mobile terminator 200.

At 1710, the enriched data channel is established between the second mobile originator 100b and the HTTP server 300a. At 1712, the call composer session is established between the second mobile originator 100b and the mobile terminator 200.

At 1714, the MSRP message is exchanged between the second mobile originator 100b and the mobile terminator 200. While exchanging the MSRP message between the second mobile originator 100b and the mobile terminator 200, the second mobile originator 100b sends the second link information to the mobile terminator 200.

At 1716, the MSRP message is exchanged between the second mobile originator 100b and the mobile terminator 200. While exchanging the MSRP message between the second mobile originator 100b and the mobile terminator 200, the enriched data with the composer_id_2 is informed to the mobile terminator.

At 1718, the second mobile originator 100b sends the CS call request to the call server 300b. At 1720, the MSRP message is exchanged between the first mobile originator 100a and the mobile terminator 200.

At 1722, the first mobile originator 100a sends a VoLTE INVITE along with the P-EDATA-INFO header set to composer_id_1 to the call server 300b. At 1724, the call server 300b sends the CS call request message to the mobile terminator 200.

The mobile terminator 200 detects enriched data ambiguity and executes a consent mechanism for resolution.

At 1726, the MSRP message is exchanged between the second mobile originator 100b and the mobile terminator 200. While exchanging the MSRP message between the second mobile originator 100b and the mobile terminator 200, the mobile terminator 200 sends the consent query message to the second mobile originator 100b.

At 1728, the MSRP message is exchanged between the first mobile originator 100a and the mobile terminator 200. While exchanging the MSRP message between the first mobile originator 100a and the mobile terminator 200, the mobile terminator 200 sends the consent query message to the first mobile originator 100a.

The second mobile originator 100b detects that the call is in ringing state and responds with the consent ack. At 1730, the MSRP message is exchanged between the second mobile originator 100b and the mobile terminator 200. While exchanging the MSRP message between the second mobile originator 100b and the mobile terminator 200, the mobile terminator 200 receives the consent response message from the second mobile originator 100b.

FIG. 18 is sequence diagram illustrating various operations for managing enriched call data in a communication network, when a mobile terminator receives an anonymous call from a user of the first mobile originator and a user of the second mobile originator at a same time, according to an embodiment of the present disclosure.

Referring to FIG. 18, consider the scenario, where the user of the first mobile originator 100a makes for the anonymous call to the mobile terminator 200 by providing the enriched call data, the user of the second mobile originator 100b prepares for a normal anonymous call to the mobile terminator 200. The mobile terminator 200 receives the anonymous call from the user of the first mobile originator 100a and the user of the second mobile originator 100b at a same time. At 1802, the enriched data channel is established between the first mobile originator 100a and the HTTP server 300a. At 1804, the call composer session is established between the first mobile originator 100a and the mobile terminator 200. At 1806, the MSRP message is exchanged between the first mobile originator 100a and the mobile terminator 200. While exchanging the MSRP message between the first mobile originator 100a and the mobile terminator 200, the first mobile originator 100a sends the first link information to the mobile terminator 200.

At 1808, the enriched data channel is established between the HTTP server 300a and the mobile terminator 200. At 1810, the enriched data channel is established between the second mobile originator 100b and the HTTP server 300a. At 1812, the call composer session is established between the second mobile originator 100b and the mobile terminator 200.

At 1814, the MSRP message is exchanged between the second mobile originator 100b and the mobile terminator 200. While exchanging the MSRP message between the second mobile originator 100b and the mobile terminator 200, the second mobile originator 100b sends the second link information to the mobile terminator 200.

At 1816, the second mobile originator 100a sends the enriched data with composer_id_2 to the mobile terminator 200. At 1818, the second mobile originator 100a sends the VoLTE invite message with P-EDATA-INFO header set to composer_id_2 to the call server 300b. At 1820, the MSRP message is exchanged between the first mobile originator 100a and the mobile terminator 200.

At 1822, the first mobile originator 100a sends the VoLTE invite message with P-EDATA-INFO header set to composer_id_2 to the call server 300b. At 1824, the call server 300b sends the VoLTE call with P-EDATA-INFO composer_id_1 to the mobile terminator 200. The mobile terminator 200 matches the information received in P-EData-Info header against the composer ID information received in the enriched data xml.

FIG. 19 is sequence diagram illustrating various operations for managing enriched call data in a communication network, when a mobile terminator receives an anonymous CS call, according to an embodiment of the present disclosure.

Referring to FIG. 19, consider the scenario, where the user of the first mobile originator 100a makes for the anonymous call to the mobile terminator 200 by providing the enriched call data, the user of the second mobile originator 100b prepares for anonymous call to the mobile terminator 200. The mobile terminator 200 receives the anonymous CS call. The first mobile originator 100a is in the RCS AA mode, the second mobile originator 100b is in the RCS CS mode, and the mobile terminator 200 is in the RCS AA mode.

At 1902, the enriched data channel is established between the first mobile originator 100a and the HTTP server 300a. At 1904, the call composer session is established between the first mobile originator 100a and the mobile terminator 200. At 1906, the MSRP message is exchanged between the first mobile originator 100a and the mobile terminator 200. While exchanging the MSRP message between the first mobile originator 100a and the mobile terminator 200, the first mobile originator 100a sends the first link information to the mobile terminator 200. At 1908, the enriched data channel is established between the HTTP server 300a and the mobile terminator 200.

At 1910, the enriched data channel is established between the second mobile originator 100b and the HTTP server 300a. At 1912, the call composer session is established between the second mobile originator 100b and the mobile terminator 200.

At 1914, the MSRP message is exchanged between the second mobile originator 100b and the mobile terminator 200. While exchanging the MSRP message between the second mobile originator 100b and the mobile terminator 200, the second mobile originator 100b sends the second link information to the mobile terminator 200.

At 1916, the MSRP message is exchanged between the second mobile originator 100b and the mobile terminator 200. While exchanging the MSRP message between the second mobile originator 100b and the mobile terminator 200, the enriched data with the composer_id_2 is informed to the mobile terminator 200.

At 1918, the second mobile originator 100b sends the CS call request to the call server 300b. At 1920, the MSRP message is exchanged between the first mobile originator 100a and the mobile terminator 200.

At 1922, the first mobile originator 100a sends the VoLTE INVITE along with the P-EDATA-INFO header set to composer_id_1 to the call server 300b. At 1924, the call server 300b sends the CS call request message to the mobile terminator 200. The mobile terminator 200 detects enriched data ambiguity and executes the consent mechanism for resolution.

At 1926, the MSRP message is exchanged between the second mobile originator 100b and the mobile terminator 200. While exchanging the MSRP message between the second mobile originator 100b and the mobile terminator 200, the mobile terminator 200 sends the consent query message to the second mobile originator 100b.

At 1928, the MSRP message is exchanged between the first mobile originator 100a and the mobile terminator 200. While exchanging the MSRP message between the first mobile originator 100a and the mobile terminator 200, the mobile terminator 200 sends the consent query message to the first mobile originator 100a.

The second mobile originator 100b detects that the call is in ringing state and responds with the consent ack. At 1930, the MSRP message is exchanged between the second mobile originator 100b and the mobile terminator 200. While exchanging the MSRP message between the second mobile originator 100b and the mobile terminator 200, the mobile terminator 200 receives the consent response message from the second mobile originator 100b.

FIG. 20 is sequence diagram illustrating various operations for managing enriched call data in a communication network, when a mobile terminator receives an anonymous CS call from a dual SIM of a mobile originator, according to an embodiment of the present disclosure.

Referring to FIG. 20, firstly consider the scenario, more than one user instance of the mobile originator 100 makes for the call to the mobile terminator 200 at the same time. The first SIM associated with the mobile originator 100 makes the call to the mobile terminator 200 by providing the enriched call data. The second SIM associated with the mobile originator 100 makes the call to the mobile terminator 200 by providing the enriched call data.

At 2002, the enriched data channel is established between the first SIM associated with the mobile originator 100 and the HTTP server 300a. At 2004, the call composer session is established between the first SIM associated with the mobile originator 100 and the mobile terminator 200. At 2006, the MSRP message is exchanged between the first SIM associated with the mobile originator 100 and the mobile terminator 200. While exchanging the MSRP message between the first SIM associated with the mobile originator 100 and the mobile terminator 200, the first SIM associated with the mobile originator 100 sends the first link information to the mobile terminator 200.

At 2008, the enriched data channel is established between the HTTP server 300a and the mobile terminator 200.

At 2010, the MSRP message is exchanged between the first SIM associated with the mobile originator 100 and the mobile terminator 200. While exchanging the MSRP message between the first SIM associated with the mobile originator 100 and the mobile terminator 200, the first SIM associated with the mobile originator 100 sends the second link information to the mobile terminator 200.

At 2012, the second SIM associated with the mobile originator 100 sends the CS call request to the call server 300b. At 2014, the MSRP message is exchanged between the second SIM associated with the mobile originator 100 and the mobile terminator 200. While exchanging the MSRP message between the second SIM associated with the mobile originator 100 and the mobile terminator 200, the mobile terminator 200 sends the consent query message to the second SIM associated with the mobile originator 100.

At 2016, the MSRP message is exchanged between the first SIM associated with the mobile originator 100 and the mobile terminator 200. While exchanging the MSRP message between the first SIM associated with the mobile originator 100 and the mobile terminator 200, the mobile terminator 200 sends the consent query message to the first SIM associated with the mobile originator 100.

The first SIM associated with the mobile originator 100 detects that the call is in ringing state and responds with the consent ack.

The mobile terminator 200 detects enriched data ambiguity as the MSISDN are different for enriched call and call and executes consent mechanism for resolution. At 2018, the MSRP message is exchanged between the second SIM associated with the mobile originator 100 and the mobile terminator 200. While exchanging the MSRP message between the second SIM associated with the mobile originator 100 and the mobile terminator 200, the mobile terminator 200 receives the consent response message from the second SIM associated with the mobile originator 100.

Based on the consent response message, the enriched data from the second SIM associated with the mobile originator 100 is displayed on the mobile terminator 200.

FIG. 21 is sequence diagram illustrating various operations for managing enriched call data in a communication network based on a consent query mechanism, according to an embodiment of the present disclosure.

Referring to FIG. 21, at 2102, the mobile terminator 200 sends the consent query request message to the second mobile originator 100b, where the mobile terminator 200 is in the dialing state. At 2104, the mobile terminator 200 sends the consent query request message to the first mobile originator 100a, where the mobile terminator 200 is in the dialing state. At 2106, based on the consent query request message, the second mobile originator 100b sends the consent query response message to the mobile terminator 200, where the mobile terminator 200 is in the ringing state Further, the consent query request message and the consent query response message are an additional MSRP signaling that takes place over an existing composer channel whenever the incoming call is received and the mobile terminator 200 detects the enriched data ambiguity.

In an embodiment, the consent query mechanism is used whenever the mobile terminator 200 receives the call over the CS interface or the VoLTE call without P-EData-Info header, decision to choose stored enriched data for the incoming call, depends on the additional consent provided by the MO device instance.

In an embodiment, the mobile terminator 200 sends the consent query request messages to all the remote users with whom it has active composer channels. The remote user whose call enters in the ringing state responds to the mobile terminator 200 in a form of the consent query response message (e.g., consent acknowledgement message. Further, the mobile terminator 200 displays the RCS enriched data of the user who responds with consent query response message.

Below is an example of a consent query request message:

```
<?xml version="1.0" encoding="UTF-8">
<rcsenvelope xmlns="urn:gsma:params:xml:ns:rcs:rcs:calldata">
<rcscalldata>
<consent>0</consent>
<composerid>12345kjh29x97us97d</composerid>
</rcscalldata>
</rcsenvelope>
Below is an example of a consent query response message:
<?xml version="1.0" encoding="UTF-8"?>
<rcsenvelope xmlns="urn:gsma:params:xml:ns:rcs:rcs:calldata">
<rcscalldata>
<consent>1</consent>
<composerid>12345kjh29x97us97d</composerid>
</rcscalldata>
</rcsenvelope>
```

In an example, the call composer schema (application/vnd.gsma.encall+xml) is modified with a new node 'consent' introduced in this schema. 'consent' xml node will be present with value 0 for all consent query messages. 'consent' xml node will be present with value 1 for all consent ACK messages. The composer_id will be included in consent query/ACK messages.

Preferably, a method for managing enriched call data in a communication network is provided. The method comprises:

receiving, by a mobile terminator, an enriched call data from at least one enriched data channel;

receiving, by the mobile terminator, at least one voice call data from at least one voice data channel from at least one mobile originator;

sending, by the mobile terminator, a consent query request to the mobile originator;

receiving, by the mobile terminator, a consent query response from the at least one mobile originator; and identifying, by the mobile terminator, an association of the at least one mobile originator with the enriched call data and the at least one voice call data based on the consent query response.

Preferably, the enriched call data comprises an anonymous identifier which hides an identity of at least one mobile originator of the enriched call data when an anonymous enriched call is originated, wherein the at least one voice data comprises an anonymous identifier which hides an identity of at least one mobile originator of the voice data when an anonymous voice call is originated.

Preferably, the enriched call data comprises an MSISDN identifier of at least one mobile originator of the enriched call data when an enriched call is originated, wherein the at least one voice data comprises an MSISDN identifier which hides an identity of at least one mobile originator of the voice data when a voice call is originated. Preferably, the MSISDN identifier of the enriched call data is different than the MSISDN identifier of the at least one voice call data, and wherein the at least one voice call data is associated with one of a volte call data and a CS call data.

Preferably, the MSISDN identifier of the enriched call data is same as the MSISDN identifier of the at least one voice call data, when the enriched call is received from a plurality of mobile originator.

Preferably, a method for managing enriched call data in a communication network is provided. The method comprises:

receiving, by a mobile terminator, an enriched call data associated with a first contact number of a mobile originator;

receiving, by the mobile terminator, a voice call data from a second contact number of the mobile originator;

generating and sending, by the mobile terminator, a consent query request to the first contact number of the mobile originator;

receiving, by the mobile terminator, a consent query response from the second contact number of the mobile originator; and identifying, by the mobile terminator, an association of the at least one mobile originator with the enriched call data and the voice call data based on the consent query response.

Preferably, the enriched call data comprises an anonymous identifier which hides an identity of at least one mobile originator of the enriched call data when an anonymous enriched call is originated, wherein the at least one voice data comprises an anonymous identifier which hides an identity of at least one mobile originator of the voice data when an anonymous voice call is originated. Preferably, the enriched call data comprises an MSISDN identifier of at least one mobile originator of the enriched call data when an enriched call is originated, wherein the at least one voice data comprises an MSISDN identifier which hides an identity of at least one mobile originator of the voice data when an voice call is originated, and wherein the MSISDN identifier of the enriched call data is different than the MSISDN identifier of the at least one voice call data.

Preferably, a method for managing enriched call data in a communication network is provided. The method comprises:

sending, by a mobile originator, an enriched call data from a first contact number to a mobile terminator;

receiving, by the mobile originator, a voice call data from a second contact number to the mobile terminator;

sending, by the mobile originator, a consent query request to the first contact number of the mobile originator;

receiving, by the mobile originator, a consent query response from the second contact number of the mobile originator, wherein the consent query response is used to identify an association between the enriched call data and the voice call data of the mobile originator.

Preferably, the enriched call data comprises an anonymous identifier which hides an identity of at least one mobile originator of the enriched call data when an anonymous enriched call is originated, wherein the at least one voice data comprises an anonymous identifier which hides an identity of at least one mobile originator of the voice data when an anonymous voice call is originated.

Preferably, the enriched call data comprises an MSISDN identifier of at least one mobile originator of the enriched call data when an enriched call is originated, wherein the at least one voice data comprises an MSISDN identifier which hides an identity of at least one mobile originator of the voice data when an voice call is originated.

Preferably, the MSISDN identifier of the enriched call data is different than the MSISDN identifier of the at least one voice call data.

Preferably, the MSISDN identifier of the enriched call data is same as the MSISDN identifier of the at least one voice call data, when the enriched call is received from a plurality of mobile originator.

Preferably, a mobile terminator for managing enriched call data in a communication network is provided. The mobile terminator comprises:

a memory;

a processor; and an enriched data controller, coupled to the memory and the processor, configured for:

receiving an enriched call data from at least one enriched data channel;

receiving at least one voice call data from at least one voice data channel from at least one mobile originator, wherein the at least one voice call data comprises a header including a unique composer identifier;

mapping the at least one voice call data to the enriched call data based on the unique composer identifier; and identifying an association of the at least one mobile originator with the enriched call data and the at least one voice call data based on the mapping.

Preferably, the enriched call data comprises an anonymous identifier which hides an identity of at least one mobile originator of the enriched call data when an anonymous enriched call is originated, wherein the at least one voice data comprises an anonymous identifier which hides an identity of at least one mobile originator of the voice data when an anonymous voice call is originated.

Preferably, the enriched call data comprises an MSISDN identifier of at least one mobile originator of the enriched call data when an enriched call is originated, wherein the at least one voice data comprises an MSISDN identifier which hides an identity of at least one mobile originator of the voice data when an voice call is originated.

Preferably, the MSISDN identifier of the enriched call data is different than the MSISDN identifier of the at least one voice call data, and wherein the at least one voice call data is associated with one of a VoLTE call data and a CS call data.

Preferably, the MSISDN identifier of the enriched call data is same as the MSISDN identifier of the at least one voice call data, when the enriched call is received from a plurality of mobile originator.

Preferably, the header is a P-EData-Info header comprising a composer identifier field to indicate the unique composer identifier, and wherein the unique composer identifier is formed by enriching a composer identifier field present in a call composer schema application with device information of the at least one mobile originator Preferably, the unique composer identifier comprises an anonymous identifier and an instance identifier, wherein the instance identifier is determined based on a network information supported by a device of the mobile originator.

Preferably, the header is included in a SIP message to create a unique association of the enriched call data and the voice call data, and wherein the unique association identifies that the enriched call data and the voice call data is originated by same mobile originator.

Preferably, a mobile terminator for managing enriched call data in a communication network is provided. The mobile terminator comprises:

a memory;

a processor; and an enriched data controller, coupled to the memory and the processor, configured for:

receiving an enriched call data from at least one enriched data channel;

receiving at least one voice call data from at least one voice data channel from at least one mobile originator;

sending a consent query request to the mobile originator;

receiving a consent query response from the at least one mobile originator; and identifying an association of the at least one mobile originator with the enriched call data and the at least one voice call data based on the consent query response.

Preferably, the enriched call data comprises an anonymous identifier which hides an identity of at least one mobile originator of the enriched call data when an anonymous enriched call is originated, wherein the at least one voice data comprises an anonymous identifier which hides an identity of at least one mobile originator of the voice data when an anonymous voice call is originated.

Preferably, the enriched call data comprises an MSISDN identifier of at least one mobile originator of the enriched call data when an enriched call is originated, wherein the at least one voice data comprises an MSISDN identifier which hides an identity of at least one mobile originator of the voice data when an voice call is originated.

Preferably, the MSISDN identifier of the enriched call data is different than the MSISDN identifier of the at least one voice call data, and wherein the at least one voice call data is associated with one of a VoLTE call data and a CS call data.

Preferably, wherein the MSISDN identifier of the enriched call data is same as the MSISDN identifier of the at least one voice call data, when the enriched call is received from a plurality of mobile originator.

Preferably, a mobile terminator for managing enriched call data in a communication network is provided. The mobile terminator comprises:

a memory;

a processor; and an enriched data controller, coupled to the memory and the processor, configured for:

receiving an enriched call data associated with a first contact number of a mobile originator;

receiving a voice call data from a second contact number of the mobile originator;

generating and sending a consent query request to the first contact number of the mobile originator;

receiving a consent query response from the second contact number of the mobile originator; and identifying an association of the at least one mobile originator with the enriched call data and the voice call data based on the consent query response.

Preferably, the enriched call data comprises an anonymous identifier which hides an identity of at least one mobile originator of the enriched call data when an anonymous enriched call is originated, wherein the at least one voice data comprises an anonymous identifier which hides an identity of at least one mobile originator of the voice data when an anonymous voice call is originated.

Preferably, the enriched call data comprises an MSISDN identifier of at least one mobile originator of the enriched call data when an enriched call is originated, wherein the at least one voice data comprises an MSISDN identifier which hides an identity of at least one mobile originator of the voice data when an voice call is originated, and wherein the MSISDN identifier of the enriched call data is different than the MSISDN identifier of the at least one voice call data.

Preferably, a mobile originator for managing enriched call data in a communication network is provided. The mobile originator comprises:

a memory;

a processor; and an enriched data controller, coupled to the memory and the processor, configured for:

sending an enriched call data over at least one enriched data channel;

composing a header including a unique composer identifier, wherein the unique composer identifier is used to identify an association between the enriched call data and a voice call data of the mobile originator; and sending the voice call data including the header over at least one voice data channel to a mobile terminator.

Preferably, the enriched call data comprises an anonymous identifier which hides an identity of at least one mobile originator of the enriched call data when an anonymous enriched call is originated, wherein the at least one voice data comprises an anonymous identifier which hides an identity of at least one mobile originator of the voice data when an anonymous voice call is originated.

Preferably, the enriched call data comprises an MSISDN identifier of at least one mobile originator of the enriched call data when an enriched call is originated, wherein the at least one voice data comprises an MSISDN identifier which hides an identity of at least one mobile originator of the voice data when an voice call is originated.

Preferably, the MSISDN identifier of the enriched call data is different than the MSISDN identifier of the at least one voice call data, and wherein the at least one voice call data is associated with one of a VoLTE call data and a CS call data.

Preferably, the MSISDN identifier of the enriched call data is same as the MSISDN identifier of the at least one voice call data, when the enriched call is received from a plurality of mobile originator.

Preferably, the header is a P-EData-Info header comprising a composer identifier field to indicate the unique composer identifier, and wherein the unique composer identifier is formed by enriching a composer identifier field present in a call composer schema application with device information of the at least one mobile originator Preferably, the unique composer identifier comprising an anonymous identifier and an instance identifier, wherein the instance identifier is determined based on a network information supported by a device of the mobile originator.

Preferably, the header is included in a SIP message to create a unique association of the enriched call data and the voice call data, and wherein the association identifies that the enriched call data and the voice call data is originated by same mobile originator.

Preferably, a mobile originator for managing enriched call data in a communication network is provided. The mobile originator comprises:

a memory;

a processor; and an enriched data controller, coupled to the memory and the processor, configured for:

sending an enriched call data from a first contact number to a mobile terminator;

receiving a voice call data from a second contact number to the mobile terminator;

sending a consent query request to the first contact number of the mobile originator;

receiving a consent query response from the second contact number of the mobile originator, wherein the consent query response is used to identify an association between the enriched call data and the voice call data of the mobile originator.

Preferably, the enriched call data comprises an anonymous identifier which hides an identity of at least one mobile originator of the enriched call data when an anonymous enriched call is originated, wherein the at least one voice data comprises an anonymous identifier which hides an identity of at least one mobile originator of the voice data when an anonymous voice call is originated.

Preferably, the enriched call data comprises an MSISDN identifier of at least one mobile originator of the enriched call data when an enriched call is originated, wherein the at least one voice data comprises an MSISDN identifier which hides an identity of at least one mobile originator of the voice data when an voice call is originated.

Preferably, the MSISDN identifier of the enriched call data is different than the MSISDN identifier of the at least one voice call data.

Preferably, the MSISDN identifier of the enriched call data is same as the MSISDN identifier of the at least one voice call data, when the enriched call is received from a plurality of mobile originator.

Preferably, a method for managing enriched call data in a communication network is provided. The method comprises:

sending, by a mobile originator, an enriched call data over at least one enriched data channel;

sending, by the mobile originator, at least one voice call data over at least one voice data channel to a mobile terminator;

receiving, by the mobile originator, a consent query request from the mobile terminator; and sending, by the mobile originator, a consent query response to the mobile terminator, wherein the consent query response is used to identify the association between the enriched call data and the voice call data of the mobile originator Preferably, the enriched call data comprises an anonymous identifier which hides an identity of the mobile originator of the enriched call data when an anonymous enriched call is originated, wherein the at least one voice data comprises an anonymous identifier which hides an identity of the at least one mobile originator of the voice data when an anonymous voice call is originated.

Preferably, the enriched call data comprises an MSISDN identifier of at least one mobile originator of the enriched call data when an enriched call is originated, wherein the at least one voice data comprises an MSISDN identifier which hides an identity of at least one mobile originator of the voice data when an voice call is originated.

Preferably, the MSISDN identifier of the enriched call data is different than the MSISDN identifier of the at least one voice call data, wherein the at least one voice call data is associated with one of a VoLTE call data and a CS call data.

Preferably, a mobile originator for managing enriched call data in a communication network is provided. The mobile originator comprises:

a memory;

a processor; and an enriched data controller, coupled to the memory and the processor, configured for:

sending an enriched call data over at least one enriched data channel;

sending at least one voice call data over at least one voice data channel to a mobile terminator;

receiving a consent query request from the mobile terminator; and sending a consent query response to the mobile terminator, wherein the consent query response is used to identify the association between the enriched call data and the voice call data of the mobile originator Preferably, the enriched call data comprises an anonymous identifier which hides an identity of the mobile originator of the enriched call data when an anonymous enriched call is originated, wherein the at least one voice data comprises an anonymous identifier which hides an identity of the at least one mobile originator of the voice data when an anonymous voice call is originated.

Preferably, the enriched call data comprises an MSISDN identifier of at least one mobile originator of the enriched call data when an enriched call is originated, wherein the at least one voice data comprises an MSISDN identifier which hides an identity of at least one mobile originator of the voice data when an voice call is originated.

Preferably, the MSISDN identifier of the enriched call data is different than the MSISDN identifier of the at least one voice call data, wherein the at least one voice call data is associated with one of a VoLTE call data and a CS call data.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet).The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like).A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The embodiments disclosed herein can be implemented through at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method of a first device in a communication network, comprising:
   receiving an enriched call data from at least one enriched data channel;
   receiving at least one voice call data from at least one voice data channel from at least one second device, wherein the at least one voice call data comprises a first header including a first identifier;
   mapping the at least one voice call data to the enriched call data based on the first identifier; and
   identifying an association of the at least one second device with the enriched call data and the at least one voice call data based on the mapping.

2. The method of claim 1, wherein the enriched call data comprises an anonymous identifier which hides an identity of at least one second device of the enriched call data when an anonymous enriched call is originated, wherein the at least one voice data comprises an anonymous identifier which hides an identity of at least one second device of the voice data when an anonymous voice call is originated.

3. The method of claim 1, wherein the enriched call data comprises a mobile station international subscriber directory number (MSISDN) identifier of the at least one second device of the enriched call data when an enriched call is originated, and wherein the at least one voice data comprises an MSISDN identifier which hides an identity of the at least one second device of the voice data when a voice call is originated.

4. The method of claim 3, wherein the MSISDN identifier of the enriched call data is different than the MSISDN identifier of the at least one voice call data, and wherein the at least one voice call data is associated with one of a voice over long-term evolution (VoLTE) call data and a circuit switched (CS) call data.

5. The method of claim 3, wherein the MSISDN identifier of the enriched call data is same as the MSISDN identifier of the at least one voice call data, when the enriched call is received from a plurality of second devices.

6. The method of claim 1, wherein the first header includes a second header comprising a composer identifier field to indicate the first identifier, and wherein the first identifier is formed by enriching a composer identifier field present in a call composer schema application with device information of the at least one second device.

7. The method of claim 1, wherein the first identifier comprises an anonymous identifier and an instance identifier, and wherein the instance identifier is determined based on network information supported by the second device.

8. The method of claim 1, wherein the first header is included in a session initiation protocol (SIP) message to create a unique association of the enriched call data and the voice call data, and wherein the association identifies that the enriched call data and the voice call data are originated by a same second device.

9. A method of a second device in a communication network, comprising:
   sending an enriched call data over at least one enriched data channel;
   composing a header including a first identifier, wherein the first identifier is used to identify an association between the enriched call data and a voice call data of the second device; and
   sending the voice call data including the first header over at least one voice data channel to a first device.

10. The method of claim 9, wherein the enriched call data comprises an anonymous identifier which hides an identity of at least one second device of the enriched call data when an anonymous enriched call is originated, and wherein the at least one voice data comprises an anonymous identifier which hides an identity of at least one second device of the voice data when an anonymous voice call is originated.

11. The method of claim 9, wherein the enriched call data comprises a mobile station international subscriber directory number (MSISDN) identifier of at least one second device of the enriched call data when an enriched call is originated, and wherein the at least one voice data comprises an MSISDN identifier which hides an identity of at least one second device of the voice data when an voice call is originated.

12. The method of claim 9, wherein the first header includes a first header comprising a composer identifier field to indicate the first identifier, and wherein the first identifier is formed by enriching a composer identifier field present in a call composer schema application with device information of the second device.

13. The method of claim 9, wherein the first identifier comprising an anonymous identifier and an instance identifier, and wherein the instance identifier is determined based on network information supported by the second device.

14. A first device in a communication network, comprising:
- a transceiver configured to:
  - receiving an enriched call data from at least one enriched data channel, and
  - receiving at least one voice call data from at least one voice data channel from at least one second device, wherein the at least one voice call data comprises a first header including a first identifier; and
- at least one processor configured to:
  - map the at least one voice call data to the enriched call data based on the first identifier, and
  - identify an association of the at least one second device with the enriched call data and the at least one voice call data based on the mapping.

15. The first device of claim 14, wherein the enriched call data comprises an anonymous identifier which hides an identity of at least one second device of the enriched call data when an anonymous enriched call is originated, wherein the at least one voice call data comprises an anonymous identifier which hides an identity of at least one second device of the at least one voice call data when an anonymous voice call is originated.

16. The first device of claim 14, wherein the enriched call data comprises a mobile station international subscriber directory number (MSISDN) identifier of the at least one second device of the enriched call data when an enriched call is originated, and wherein the at least one voice data comprises an MSISDN identifier which hides an identity of the at least one second device of the voice data when a voice call is originated.

17. The first device of claim 16, wherein the MSISDN identifier of the enriched call data is different than the MSISDN identifier of the at least one voice call data, and wherein the at least one voice call data is associated with one of a voice over long-term evolution (VoLTE) call data and a circuit switched (CS) call data.

18. The first device of claim 16, wherein the MSISDN identifier of the enriched call data is same as the MSISDN identifier of the at least one voice call data, when the enriched call is received from a plurality of second devices.

19. The first device of claim 14, wherein the first header includes a second header comprising a composer identifier field to indicate the first identifier, and wherein the first identifier is formed by enriching a composer identifier field present in a call composer schema application with device information of the at least one second device, and wherein the first identifier comprises an anonymous identifier and an instance identifier, and wherein the instance identifier is determined based on network information supported by the at least one second device.

20. The first device of claim 14, wherein the first header is included in a session initiation protocol (SIP) message to create a unique association of the enriched call data and the at least one voice call data, and wherein the association identifies that the enriched call data and the voice call data are originated by a same second device.

* * * * *